(12) United States Patent
Reed et al.

(10) Patent No.: US 8,051,068 B2
(45) Date of Patent: Nov. 1, 2011

(54) TRAIL-BASED EXPLORATION OF A REPOSITORY OF DOCUMENTS

(75) Inventors: Benjamin C. Reed, Morgan Hill, CA (US); Philip Bohannon, Cupertino, CA (US); Utkarsh Srivastava, Fremont, CA (US); Daniel Meredith, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 548 days.

(21) Appl. No.: 12/106,986

(22) Filed: Apr. 21, 2008

(65) Prior Publication Data

US 2009/0265347 A1    Oct. 22, 2009

(51) Int. Cl.
*G06F 7/00* (2006.01)
*G06F 17/30* (2006.01)

(52) U.S. Cl. .................................. 707/716; 707/726
(58) Field of Classification Search .............. 707/726, 707/716
See application file for complete search history.

(56) References Cited

U.S. PATENT DOCUMENTS

| | | | |
|---|---|---|---|
| 5,163,085 A | 11/1992 | Sweet et al. | |
| 5,408,655 A * | 4/1995 | Oren et al. | 715/202 |
| 5,711,297 A * | 1/1998 | Iliff | 600/300 |
| 5,717,860 A | 2/1998 | Graber et al. | |
| 5,774,123 A | 6/1998 | Matson | |
| 5,809,247 A | 9/1998 | Richardson et al. | |
| 5,855,015 A * | 12/1998 | Shoham | 715/205 |
| 5,953,717 A * | 9/1999 | Wijnholds | 707/999.004 |
| 6,016,494 A | 1/2000 | Isensee et al. | |
| 6,289,342 B1 * | 9/2001 | Lawrence et al. | 707/999.003 |
| 6,321,220 B1 | 11/2001 | Dean et al. | |
| 6,356,898 B2 * | 3/2002 | Cohen et al. | 707/999.002 |
| 6,381,237 B1 | 4/2002 | Lam et al. | |
| 6,393,427 B1 * | 5/2002 | Vu et al. | 707/797 |
| 6,513,032 B1 * | 1/2003 | Sutter | 707/999.003 |
| 6,557,015 B1 | 4/2003 | Bates et al. | |
| 6,572,662 B2 * | 6/2003 | Manohar et al. | 715/273 |
| 6,647,383 B1 * | 11/2003 | August et al. | 707/999.003 |
| 6,772,139 B1 | 8/2004 | Smith, III | |
| 6,792,430 B1 * | 9/2004 | Kenyon et al. | 707/999.102 |
| 6,985,893 B1 * | 1/2006 | Warner et al. | 707/999.002 |
| 7,003,566 B2 * | 2/2006 | Codella et al. | 709/224 |
| 7,171,405 B2 | 1/2007 | Toong et al. | |
| 7,181,438 B1 * | 2/2007 | Szabo | 707/999.002 |
| 7,209,928 B2 * | 4/2007 | Kenyon | 707/999.102 |
| 7,315,858 B2 | 1/2008 | Potok et al. | |
| 7,540,051 B2 * | 6/2009 | Gundersen et al. | 707/999.001 |
| 7,747,610 B2 | 6/2010 | Chinchwadkar et al. | |
| 7,853,622 B1 | 12/2010 | Baluja et al. | |
| 2001/0054089 A1 | 12/2001 | Tso et al. | |
| 2003/0036940 A1 | 2/2003 | Leymann et al. | |
| 2007/0237152 A1 * | 10/2007 | Zhu | 370/392 |
| 2008/0306937 A1 * | 12/2008 | Whilte et al. | 707/5 |
| 2009/0030876 A1 * | 1/2009 | Hamilton | 707/3 |
| 2009/0265337 A1 | 10/2009 | Reed et al. | |

* cited by examiner

*Primary Examiner* — Yicun Wu
*Assistant Examiner* — Pavan Mamillapalli
(74) *Attorney, Agent, or Firm* — Hickman Palermo Truong & Becker LLP

(57) ABSTRACT

Techniques that support trail-based exploration by a user of a repository of documents are described herein. In one embodiment, trail definition data that specifies a trail is received. The trail includes an ordered series of waypoints including a trailhead, intermediate waypoints, and one or more trailends. In some embodiments, deadends may also be defined in the trail. A particular waypoint in the ordered series of waypoints is established as a current waypoint. Search terms can be received from a user to cause a search to be performed. It is then determined whether the search satisfies matching criteria associated with a waypoint that immediately follows the current waypoint in the ordered series of waypoints. If so, the user advances to the next waypoint. Otherwise, the user remains at the current waypoint. Finally, if a trailend is reached, then an action such as rewarding the user in some way may be performed.

48 Claims, 13 Drawing Sheets

TRAIL-BASED EXPLORATION OF A REPOSITORY OF DOCUMENTS

FIELD OF THE INVENTION

The present invention relates to supporting exploration of a repository of documents, and in particular, to supporting trail-based exploration of a repository of documents.

BACKGROUND

An internet user can use a browser to interact with search engines to access documents stored on the internet. The user, for example, may input a set of search terms related to a particular search topic. A search engine that receives the search terms finds documents using a variety of techniques. One such technique is for the search engine to access metadata associated with documents and only select those documents, or the links thereof, whose metadata matches one or more of the search terms inputted by the user. The links can be ranked and displayed in the order of their relevance in reference to the search terms. The selected documents may be explored by the user by clicking on their links. New search terms may also be inputted by the user to alter or to narrow the search results. Depending on complexity of the particular search topic and how capable the user is to define relevant search terms, a search may be quite long, tedious, and oftentimes frustrating.

A disadvantage of the interaction model as described above is that logical, layered relationships between certain documents are often too difficult to be uncovered by a search engine. Thus, besides ranking and displaying the links in order of relevance, the search results are typically incapable of displaying with any indication of the logical, layered relationships between the documents. Thus, to comprehend one document in light of its interrelated documents may require the user to spend an inordinate amount of time, even when it is possible to do so.

A further disadvantage of the techniques as described above is that search terms that produce one document in a group of interrelated document may not lead to producing another document in the same group, when metadata associated with the documents fails to make such interrelationships visible to the search engine. As a result, a user is only given an incomplete picture.

Thus, a need exists for improved ways of supporting exploration of a repository of documents.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
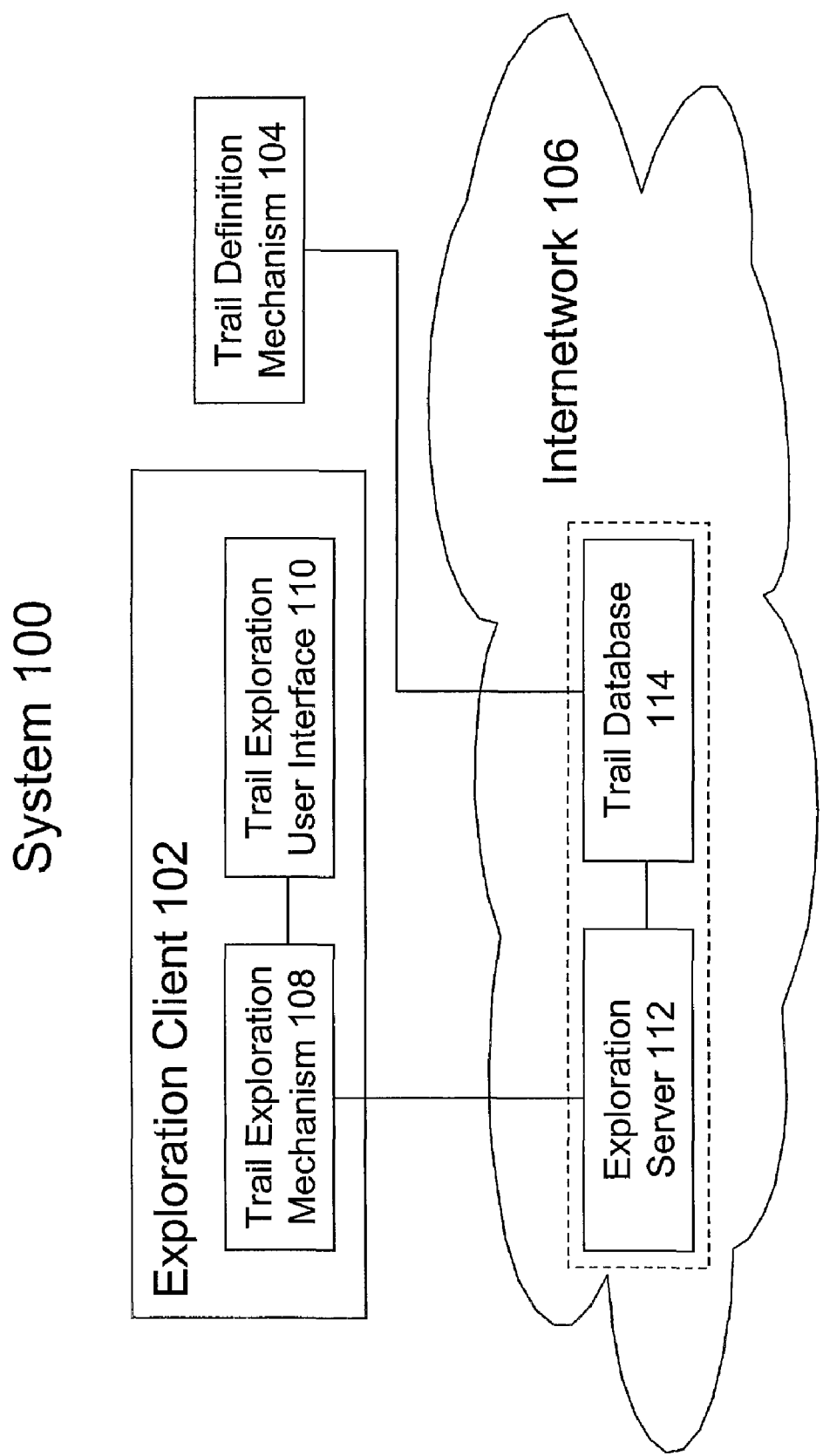
FIG. 1 is a block diagram that illustrates an example system, according to an embodiment of the present invention.

A method and apparatus for supporting trail-based exploration of a repository of documents is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In accordance with an embodiment of the present invention, trail-based exploration of a repository of documents is supported by mechanisms implemented on one or more computing devices. Trail-based exploration is built around the idea of following a chain of questions through the repository of documents using search as a vehicle. Questions are hidden in search results. When a user moves a mouse over a search result, a hidden question may appear. Users respond by entering the answer as another search query. Confirmation and a new question or prize will appear in the search results as a consequence.

Users not only may follow a trail to explore documents, but also may build zero or more such trails by defining questions and answers to be included in the trails that are to be explored by other users.

Since trail-based exploration may be offered by one or more affiliated sites, a community may be built around trail-based exploration of repositories of documents on these sites. Trail-based exploration can further encourages community building by providing statistics about the best explorers and trail builders. To attract users, rewards can also be given in the form of prizes, coupons, higher scores, etc., which will be useful, for example, in promoting certain web sites and creating opportunities for marketing.

The trails can be built for a variety of purposes. Educational trails can be built by asking questions related to a topic and using subsequent questions to refine the knowledge about that topic. Marketing trails can be built by asking questions related to a product or service and using subsequent questions to reinforce a particular commercial message. Trails can also be built for purely entertainment purposes.

Trailed-based exploration may begin with an "Easter-egg" hidden in search results. When the user moves the mouse over one of the search results, a popup will appear with a question, command, or some other prompt to start trail-based exploration.

The user responds to the prompt by submitting another search request. If any search phrase is a part of the trail, the search results will contain another Easter-egg that will inform the user of progress. The Easter-egg may even indicate an incorrect response.

At the end of the trail, a user will get a message indicating or confirming success. As alluded earlier, one or more rewards may be given to the user.

Trail-based exploration brings a degree of fun and purpose to search as a trail may be defined as an ordered series of waypoints with possible branching, as will be further explained in detail later. For example, a user may only be allowed to start exploring a trail from a certain starting point of the trail and progress from an earlier waypoint to a later waypoint along the order defined for the series of waypoints. A user may only be allowed to advance on the trail if the user produces correct search at a current waypoint. In some embodiments, the user may only be allowed to advance on the trail if the user produces such a correct search at a current waypoint within a certain time, for example, 30 minutes.

Trail-based exploration also allows creators of trails (who may be any internet user or, alternatively and optionally, who are authorized) to adds values and contents to search. As noted, a commercial advertiser may use trails to publicize its new ads. Likewise, an educator may create trails for directing students to explore a certain subject. By maintaining or creating interesting trails, websites may attract high volumes of traffic to their sites. Social networks or communities may be built around trail-based exploration.

Example System

As shown in FIG. 1, system 100 comprises an exploration client 102, a trail definition mechanism 104, and an internetwork 106. As illustrated in FIG. 1, the exploration client (102) comprises a trail exploration mechanism 108 and a trail exploration user interface 110. In some embodiments, the trail exploration user interface (110) provides a browser to a user for interacting with one or more search engines in the internetwork 106, including but not limited to an exploration server 112. As illustrated, the trail exploration user interface (110) may interact with the exploration server (112) through the trail exploration mechanism (108).

The trail exploration mechanism (108) has one or more communication links with the exploration server (112). These communication links may be of a variety of different physical interfaces or speeds or distances (LAN, metro, WAN, etc.). Through the communication links, the trail exploration mechanism can send client data including user input received at the trail exploration user interface (110) to the exploration server (112). Likewise, the trail exploration mechanism (108) receives server data including trail exploration related data (such as those illustrated in FIG. 4, as will be further explained in detail) from the exploration server (112) or any other server in the internetwork 106.

The trail exploration user interface (110) may be used by the system to receive user input such as search terms related to one or more search topics. The trail exploration user interface (110) may also be used to render or display search results and/or trail exploration information originated from, or forwarded by, the trail exploration mechanism (108).

As illustrated in FIG. 1, the trail exploration user interface (110) may be connected to the trail exploration mechanism (108) through a communication link. In some embodiments, the user interface (110) may be a directly attached device to the exploration client (102) that implements the trail exploration mechanism (108).

In some embodiments, the trail exploration mechanism (108) receives trail exploration related data from the exploration server 112. At least some of the trail exploration related data is persistently stored. That is, trail exploration data related to a user in one search session may be made persistent, for example, by storing such trail exploration data on the exploration server (112). In an illustrated embodiment as shown in FIG. 1, such trail exploration data related to users in their respective search sessions may be made persistent in a trail database 114 to which the exploration server (112) has access. In some embodiments, not only user-related trail exploration data is stored in the trail database (114), but trail definition data is also stored therein.

In some embodiments, a trailblazer (i.e., a user defines and/or creates one or more trails) may use a trail definition mechanism 104 to define one or more trails that may be explored by a user that interacts with the exploration client 102. For example, a graphic based tool may be provided as a part of the trail definition mechanism (104). Such a tool may record search terms inputted by the trailblazer and allow a link among search results that are related to the search terms to be dragged to a trail definition panel to form an ordered series of waypoints for a new trail.

In alternative embodiments, the trails may be programmatically defined. For example, the records defining the trail may be programmatically loaded from another system other than the trail definition mechanism (104).

In some embodiments, trail definition data (i.e., trails) may be stored in the trail database (114).

In some embodiments, the trail definition mechanism (104) may be implemented along with the trail exploration mechanism (108) in the exploration client (102). Also, a trailblazer may use the same interface as the trail exploration user interface 110 for interacting with the trail definition mechanism (104) to define trails.

Example Trail

Figure 2:
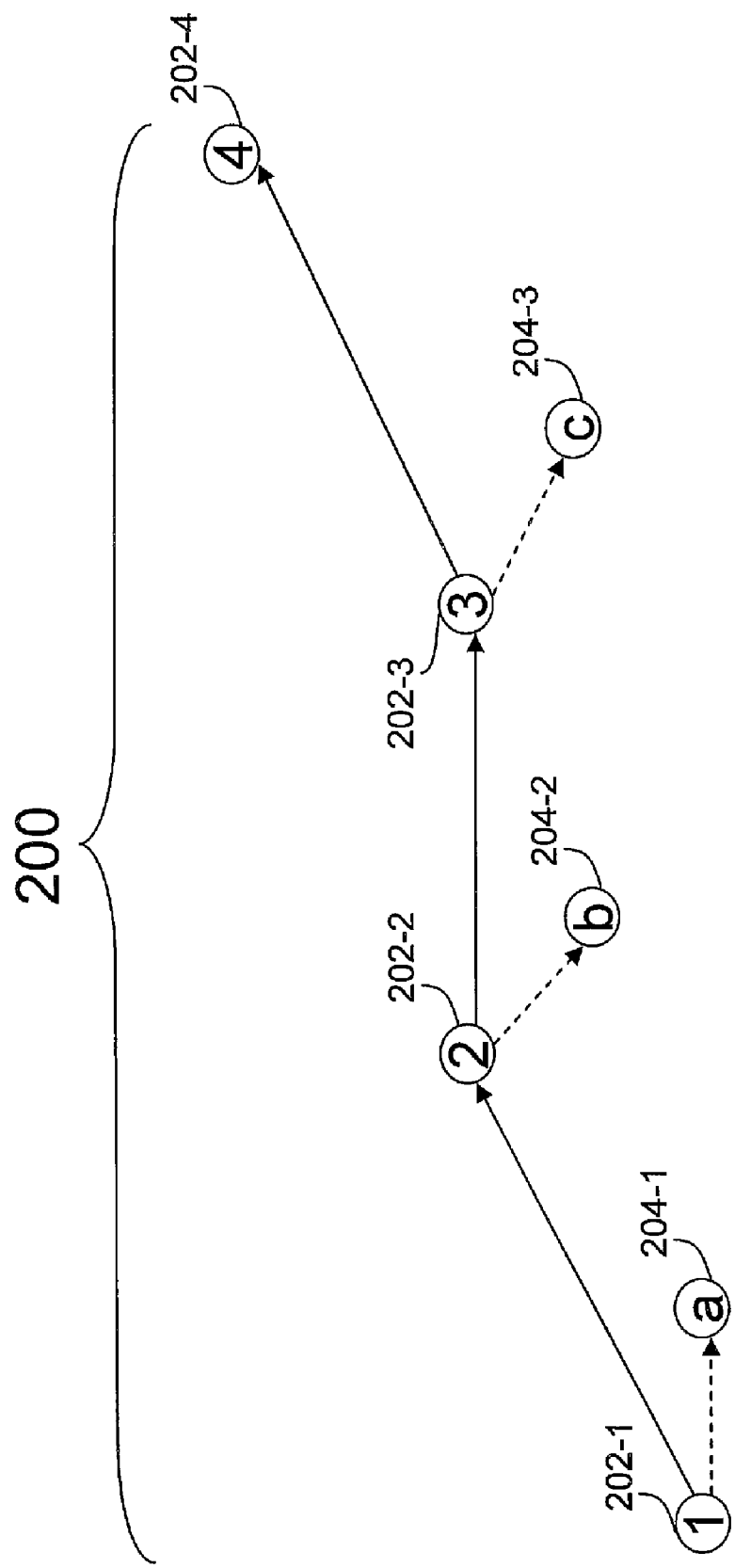
FIG. 2 is a diagram that illustrates an example exploration trail, according to an embodiment of the present invention.

FIG. 2 illustrates an example (exploration) trail 200 in accordance with an embodiment of the present invention. As illustrated in FIG. 2, the trail (200) may comprise an ordered series of two or more waypoints 202, such as 202-1 through 4. The ordered series of waypoints (circles with numerals from 1 to 4) includes a trailhead (for example, 202-1), zero or more intermediate waypoints (202-2 and 202-3), and one or more trailends (202-4).

As illustrated, the trail (200) may also comprise zero or more deadends (circles with alphabets from a to c), such as 204-1 through 3. Each of the deadends may be associated with a particular waypoint 202 on the trail 200. For example, as illustrated in FIG. 2, one of the deadends, i.e., 204-1, is associated with the trailhead (202-1), while the other deadends, i.e., 204-2 and 204-3, are associated with the intermediate waypoints 202-2 and 202-3, respectively.

In accordance with an embodiment of the present invention, a waypoint 202 may, but is not limited to, be associated with any deadend 204. Furthermore, as used herein, "a deadend is associated with a waypoint" means that a traversal from that waypoint may reach that deadend, instead of the next waypoint in the ordered series of waypoints on the trail 200.

Example Exploration of a Trail

To illustrate how exploring a trail by a user may be performed in accordance with one embodiment of the present invention, reference will now be made to an example. In the following discussion, reference will be made to display pages of FIGS. 3A-3G, and to the example trail of FIG. 2. In the following discussion, it will be assumed that the user may receive search results and trail exploration data from one or more servers such as the exploration server (112) through a mechanism such as the trail exploration mechanism (108) and a user interface such as the trail exploration user interface (110). It will also be assumed that the user may send input (for example, search terms) to one or more servers such as the exploration server (112) (for example, using the same mechanisms mentioned above). For the sake of simplicity, only one trail 200 is shown in FIG. 2 and FIGS. 3A-3G.

Example Trail Exploration User Interface

In one embodiment, as illustrated in FIGS. 3A through 3G, the trail exploration user interface (110) comprises two portions, 302 and 304. A user input region 306 is rendered or displayed in a first portion (i.e., 302) of the two portions. User input 308 may be received through an input means of the exploration client 102, and rendered or displayed in the first portion (302). The input means that receives the user input (308) can be, but is not limited to, a keyboard attached to the exploration client (102). As part of receiving the user input, one or more characters can be added to the previously made user input. Conversely, as part of receiving the user input, one or more characters may be removed from the previously made user input. The user input 308 with its present content is rendered or displayed in the user input region 306. For the purpose of illustration, the user input 308 may be, but is not limited to, search terms.

In some embodiments, a second portion (i.e., 304) of the two portions in the trail exploration user interface renders or displays search results related to the search terms last submitted by the user to a search engine (such as the exploration server 112 of FIG. 1). For example, the user may input a search term. As a result, this search term is displayed in the user input region (306). When the user submits the search term to the exploration server (112), a number of search results are returned. A part, or a whole, of the search results that are returned from the server may be displayed in the second portion (304). As illustrated in FIGS. 3A through 3G, a search result region 310 in the second portion (304) may be used to display search results related to the search term. As illustrated in FIGS. 3A, 3B, 3C, 3F, and 3G, in some embodiments, an advertisement region may be used to display ads or commercial messages that may be related to the search term submitted by the user.

Figure 3A:
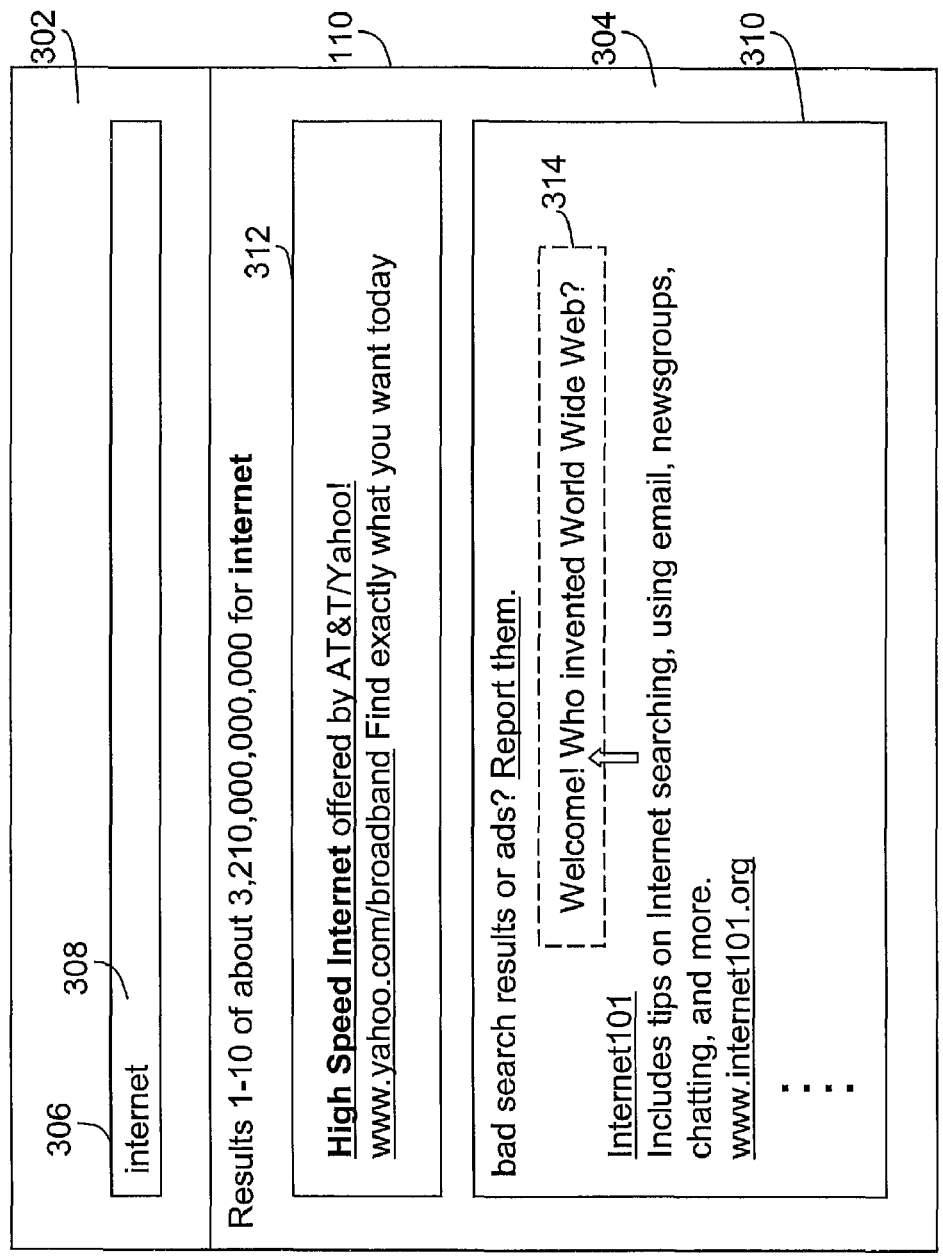
FIG. 3A through FIG. 3G are diagram that illustrates example display pages that may be involved in trail-based exploration, according to an embodiment of the present invention.

As illustrated in FIG. 3A, the user may input a first search term "internet". As a result, this search term "internet" is displayed in the user input region (306). When the user submits the first search term "internet" to the exploration server (112), a number of first search results are returned. A part, or a whole, of the first search results that are returned from the server may be displayed, as illustrated in FIG. 3A, in the search result region 310 of the second portion (304). As illustrated in FIG. 3A, in a particular embodiment, an AT&T/ Yahoo! High Speed Internet service offering is displayed in the second portion (304), along with a part of the first search results. In the present example, the part of the first search results includes a portion of content for "internet 101".

Trailhead

Each waypoint 202 may be associated with a navigational message that may be displayed on a user interface such as the trail exploration user interface 110 of FIG. 1. For example, the trailhead (202-1) of the trail (200) may be associated with a navigational message "Welcome! Who invented World Wide Web?" This navigational message, when displayed, indicates to the user that the trail 200 is available for exploration.

In some embodiments, a waypoint is associated with a portion of content displayed in the trail exploration user interface (110). For example, the trailhead (202-1) may be associated with a link that is displayed in the search result region such as "Internet101" as illustrated in FIG. 3A. This association between the trailhead (202-1) and the link "Internet101" may be made inside a downloaded display page (i.e., this association may be made in the code underlying the display page) by the exploration server 112 that is located remotely from the exploration client (102). In some embodiments, such an association may be made by the trail exploration mechanism (108) locally at the exploration client (102), for example, using a Greasemonkey type of functionality supported by a browser. Such association between a waypoint and a portion of content (such as a link displayed in the search result region 310) may be made on the basis of keyword matching, metadata matching, similarity determination between the content and the trailhead navigational message, etc.

In some embodiments, a navigational message that is associated with a waypoint is hidden from displaying to the user until a user event, such as a mouse-over event, occurs. In an example embodiment, when the user moves a pointer device such as a mouse over the portion of content that displays the link such as "Internet101" that is associated with the trailhead, the navigational message that is associated with the trailhead is displayed, thereby signaling to the user that there is an trail such as 200 available for exploration.

Exploring the Trail

In addition to being associated with a navigational message, each intermediate waypoint 202 in the ordered series of waypoints on a trail such as 200 is also associated with matching criteria. In some embodiments, to explore the trail that has been made available, the user is expected to enter one or more search terms at every current waypoint of trail exploration to produce an outcome that satisfy the matching criteria of that current waypoint, until when one of the trailends is reached.

When the user is at a display page that comprises a portion of content that is associated with a waypoint 202, that waypoint 202 is deemed as a current waypoint of trail exploration for the user. For example, when the user is at the display page as illustrated in FIG. 3A, since the trailhead (202-1) is associated with the link "Internet101" on the display page, the trailhead is deemed as a current waypoint for the user at that point. As will be further explained, as the user makes progress in exploring the trail, the current waypoint progresses from the trailhead to other waypoints in the same order as defined by the ordered series of waypoints for the trail, until a trailend is reached or until the user abandons the exploration of the trail.

At a current waypoint, the user is expected to enter one or more search terms that are related to the navigational message popped up. In some embodiments, the navigational message (which may be in the form of a question) that is associated with a waypoint (such as the trailhead) provides a hint for what the one or more search terms should be inputted at the waypoint. For example, since the message associated with the trailhead (202-1) of the trail (200) poses a question "Welcome! Who invented World Wide Web?", the user is expected to enter one or more search terms that pertains to a correct answer to that question, or that produces search results one or more of which constitute a correct answer to that question.

Figure 3B:
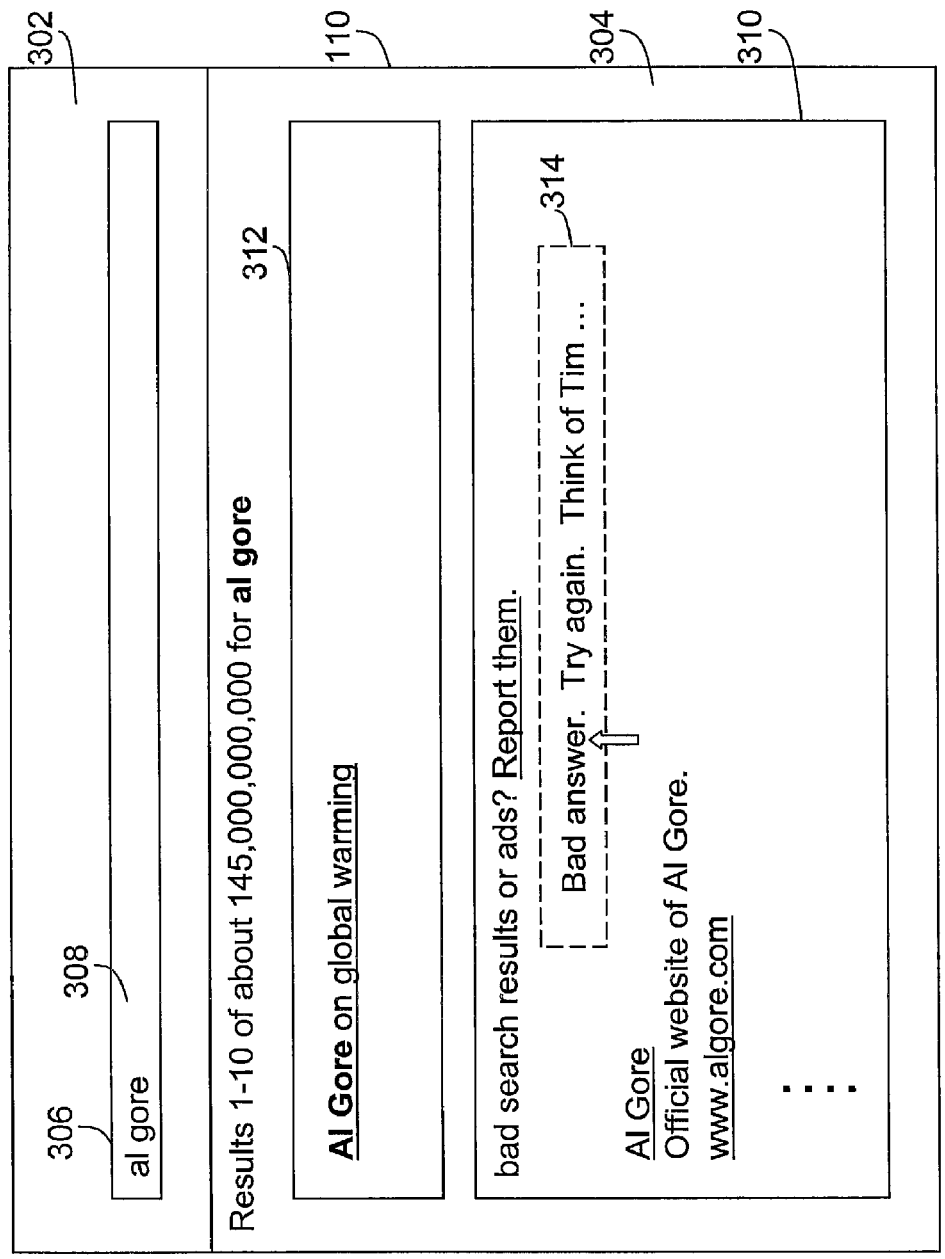

In the present example, in response to the question, the user may type "al gore" as second search terms and submit these search terms to a search engine that is accessible from the exploration client (102), as illustrated in FIG. 3B.

Matching Criteria of a Waypoint

Either the new search terms (e.g., the second search terms discussed above) entered by the user to answer the question that is associated with the current waypoint, or search results generated in response to these new search terms, or both, are next compared with the matching criteria of a waypoint next in order (relative to the current waypoint) in the ordered series of waypoints on the trail 200. For example, when the user submits "al gore" as the second search terms, the trail exploration mechanism (108) may compare the second search terms "al gore" with the matching criteria of the waypoint 202-2, which is next in order (relative to the current waypoint, i.e., the trailhead, at this point of exploration) in the ordered series of waypoints on the trail 200, to determine with the second search terms "al gore" constitute a correct answer to the hint or question presented in the current waypoint (i.e., the trailhead). For the purpose of illustration, the matching criteria of the next waypoint, i.e., 202-2, specifies a URL that is expected to appear in the search results corresponding to the new search terms. Thus, in the present example, the trail exploration mechanism (108) may compare the second search results generated in response to the submission of the second search terms (i.e., "al gore") with a URL specified in the intermediate waypoint 202-2, to determine if such a specified URL appears in the second search results.

For the purpose of illustration, instead of looking for a matching URL in the search results, the matching criteria at the intermediate waypoint 202-2 may instead specify that the new search terms must include "Tim Berners-Lee" or "Berners-Lee" in the search terms, which is the correct answer to the question "Who invented World Wide Web?" posed by the trailhead 202-1 that precedes the intermediate waypoint 202-2. Since the second search terms inputted by the user are "al gore", which does not satisfy the matching criteria specified in the intermediate waypoint 202-2, the current waypoint is not advanced to the intermediate waypoint 202-2, but rather remains at the trailhead 202-1. This type of matching criteria—i.e., the correct answers must be contained in the search terms themselves—permits an advertiser to require users/consumers to type in its product or service mark names as correct answers to questions posed and thereby to internalize/reinforce its commercial message in the mind of targeted consumers.

In an alternative embodiment, the matching criteria at the intermediate waypoint 202-2 may specify that the search results that correspond to the new search terms must include one of URL links related to "Tim Berners-Lee" or "Berners-Lee". Since the second search results corresponding to the second search terms "al gore" as inputted by the user, as illustrated in FIG. 3B, do not include a URL link related to "Berners-Lee", as specified in the matching criteria of the intermediate waypoint 202-2, the current waypoint is not advanced to the intermediate waypoint 202-2, but rather remains at the trailhead 202-1.

When a URL link is specified as the form of what a correct answer should be, the user may input a myriad of different sets of search terms as long as the specified URL link shows up in the search results. For example, the user may not know that Tim Berners-Lee invented the World Wide Web, but may still be able to produce the specified link related to Tim Berners-Lee if the search terms entered by the user happen to produce that link. Thus, in some embodiments, the trail exploration mechanism (108), working in conjunction with the exploration server (112), may only determine whether the specified URL link is in the search results. If so, the current waypoint for the user is advanced. If not, the current waypoint remains the same as before.

Deadend

As noted earlier, a waypoint 202 in the ordered series of waypoints on a trail such as 200 may be associated with zero or more deadends 204. In some embodiments, deadends are commonplace wrong answers to a question posed at a waypoint with which the deadends are associated. For example, as illustrated in FIG. 2, a deadend 204-1 is associated with the trailhead (202-1). In some embodiments, after the trail exploration mechanism (108) determines that the new search terms inputted by the user do not satisfy matching criteria of a waypoint next in order in the ordered series of waypoints on the trail 200, the trail exploration mechanism (108) further determines whether the new search terms satisfy matching criteria of a deadend that is associated with the current waypoint. For example, after the user submits "al gore" as the second search terms at the trailhead, the trail exploration mechanism (108) determines that the second search terms "al gore" do not satisfy matching criteria of a waypoint next in order in the ordered series of waypoints on the trail 200, in this case, the intermediate waypoint 202-2. In some embodiments, the trail exploration mechanism (108) optionally further compares the second search terms "al gore" with the matching criteria of each of zero or more deadends that are associated with the current waypoint. In this case, only one deadend, i.e., 204-1, is associated with the current way point, the trailhead (202-1). Thus, the trail exploration mechanism (108) only needs to compare the second search terms with the matching criterial of the deadend 204-1.

For example, the matching criteria at the deadend 204-1 may specify that the new search terms must include "Al Gore" or "Gore" (case-insensitive), which may be a commonplace wrong answer to the question "Who invented World Wide Web?" posed by the trailhead 202-1. Since the second search terms inputted by the user are "al gore", the trail exploration mechanism (108) determines that the second search terms satisfy the matching criteria specified in the deadend 204-1.

As in the case of a waypoint, in an alternative embodiment, the matching criteria at the deadend 204-1 may specify that the new search results that correspond to the new search terms must include one of URL links related to "Al Gore" or "Gore". Since the second search results corresponding to the second search terms "al gore" as inputted by the user, as illustrated in FIG. 3B, includes a URL link related to "Al Gore", the trail exploration mechanism (108) also would determine that the second search results corresponding to the second search terms "al gore" satisfy the matching criteria of the deadend 204-1 in that alternative embodiment.

In accordance with an embodiment of the present invention, when the user fails to produce an outcome that satisfies matching criteria of a next waypoint (relative to the current waypoint), the current waypoint stays the same, even though the display page with which the current waypoint is associated is no longer in display. For example, where the current waypoint is the trailhead (202-1), when the user fails to produce an outcome that satisfies matching criteria of a next waypoint, i.e., those of the intermediate waypoint 202-2, the trailhead stays as the current waypoint, even though the display page of FIG. 3B, instead of the display page of FIG. 3A, is in display.

Incorrect answers that are represented by deadends 204 are only a subset of incorrect answers. That is, any answer that does not match a next waypoint's criteria is considered as an incorrect answer, whether such an incorrect answer is defined in a deadend's criteria or not. In some embodiments, an incorrect answer inputted by a user leads to a penalty (such as a lower score) to the user. In these embodiments, an incorrect answer that is represented by a deadend may leads to an even larger penalty than otherwise.

Warning Message

Each deadend 204 may be associated with a warning message that may be displayed on a user interface such as the trail exploration user interface 110 of FIG. 1. For example, the deadend (204-1) that is associated with the trailhead (202-1) of the trail (200) may be associated with a warning message "Incorrect answer. Try again. Think of Tim . . . . " This warning message, when displayed (as illustrated in FIG. 3B), indicates that the user has strayed away from a right course for the trail that the user is exploring.

In some embodiments, a deadend is associated with a portion of content displayed in the trail exploration user interface (110), after the trail exploration mechanism determines that the new search results corresponding to the new search terms satisfy matching criteria of a deadend that is associated with the current waypoint. For example, the deadend (204-1) may be associated with a link "Al Gore" that is displayed in the search result region as illustrated in FIG. 3A. As before, this association between the deadend (204-1) and the link "Al Gore" may be made inside a downloaded display page by the exploration server 112 that is located remotely from the exploration client (102). Such an association may alternatively be made by the trail exploration mechanism (108) locally at the exploration client (102), for example, using a Greasemonkey type of functionality supported by a browser. In addition, the association between a deadend and a portion of content (such as a link displayed in the search result region 310) may be made on the basis of keyword matching, metadata matching, similarity determination between the content and the warning message that is associated with the deadend, etc.

In some embodiments, a warning message that is associated with a deadend is hidden from displaying to the user until a user event, such as a mouse-over event, occurs. In an example embodiment, when the user moves a pointer device such as a mouse over the portion of content that displays the link such as "Al Gore" that is associated with the deadend 204-1, the warning message that is associated with the deadend 204-1 is displayed, thereby indicating that the user has strayed away from a right course for the trail that the user is exploring.

Generic Warning Message

In some embodiments, the user may input new search terms that produce an outcome that satisfies matching criteria of neither a next waypoint following the current waypoint nor a deadend that is associate with the current waypoint. In one embodiment, a generic warning message may be provided to the user, indicating that the trail exploration is not progressing along the trail. In an alternative embodiment, no warning message may be provided to the user.

As in the case of reaching a deadend, when the user fails to produce an outcome that satisfies matching criteria of a next waypoint (relative to the current waypoint), the current waypoint stays the same, even though the display page with which the current waypoint is associated is no longer in display.

Moving to Next Waypoint

Figure 3C:
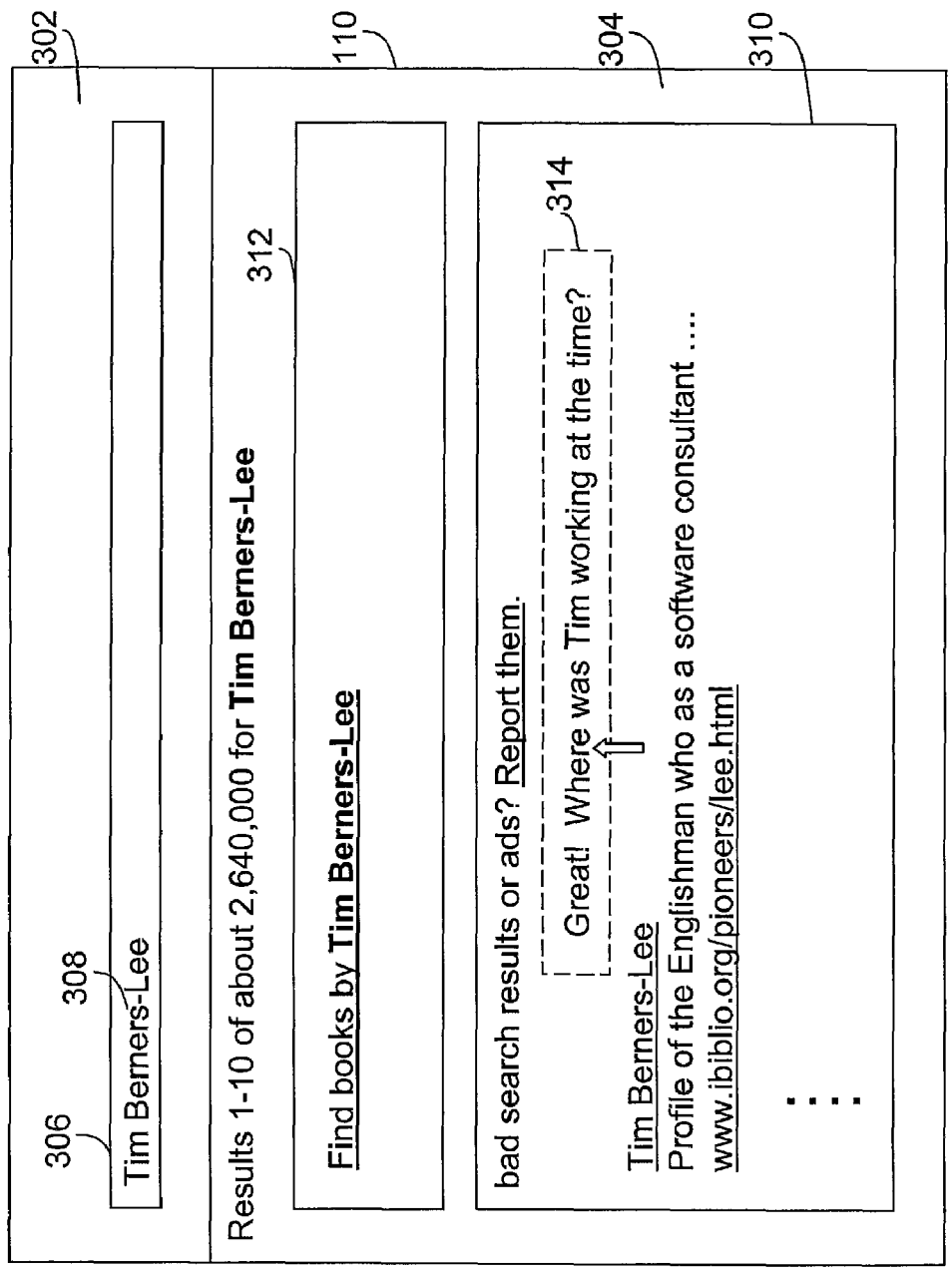

At a current waypoint, the user may input search terms that produce an outcome that satisfy matching criteria of a next waypoint (relative to the current waypoint). Consequently, the current waypoint will be advanced to the next waypoint. For example, where the current waypoint is the trailhead (202-1), the user may input third search terms, such as "Tim Berners-Lee" as illustrated in FIG. 3C, that produce a number of third search results, such as the link "Tim Berners-Lee" as illustrated in FIG. 3C. The trail exploration mechanism (108) subsequently may determine that the third search terms or the third search results satisfy the matching criteria of the intermediate waypoint 202-2. Consequently, the intermediate waypoint 202-2 now becomes the current waypoint.

As in the case of the trailhead (202-1), the intermediate waypoint 202-1 may be associated with a navigational message that may be displayed on a user interface such as the trail exploration user interface 110 of FIG. 1. For example, the intermediate waypoint 202-1 of the trail (200) may be associated with a navigational message "Great! Where was Tim working at the time?" This navigational message, when displayed, indicates to the user that the next search terms should produce an answer to the question in the navigational message (i.e., "Where was Tim working at the time?").

The intermediate link 202-2 may be associated with a link that is displayed in the search result region such as "Tim Berners-Lee" as illustrated in FIG. 3A. Again, this association between the intermediate waypoint 202-2 and the link "Tim Berners-Lee" may be made inside a downloaded display page by the exploration server 112 that is located remotely from the exploration client (102), or alternatively made by the trail exploration mechanism (108) locally at the exploration client (102).

In an example embodiment, when the user moves a pointer device such as a mouse over the portion of content that displays the link such as "Tim Berners Lee" that is associated with the intermediate waypoint 202-2, the navigational message that is associated with the intermediate waypoint 202-2 is displayed, indicating to the user that the next search terms should produce an answer to the question in the navigational message.

Reaching the Trailend

At a current waypoint, the user may input search terms that produce an outcome that satisfy matching criteria of a next waypoint (relative to the current waypoint). Consequently, the current waypoint will be advanced to the next waypoint. For example, where the current waypoint is the trailhead (202-1), the user may input third search terms, such as "Tim Berners-Lee" as illustrated in FIG. 3C, that produce a number of third search results, such as the link "Tim Berners-Lee" as illustrated in FIG. 3C. The trail exploration mechanism (108) subsequently may determine that the third search terms or the third search results satisfy the matching criteria of the intermediate waypoint 202-2. Consequently, the intermediate waypoint 202-2 now becomes the current waypoint.

As in the case of the trailhead (202-1), the intermediate waypoint 202-1 may be associated with a navigational message that may be displayed on a user interface such as the trail exploration user interface 110 of FIG. 1. For example, the intermediate waypoint 202-2 of the trail (200) may be associated with a navigational message "Great! Where was Tim working at the time?" This navigational message, when displayed, indicates to the user that the next search terms should produce an answer to the question in the navigational message (i.e., "Where was Tim working at the time?").

The above process may be repeated for every current waypoint as the user progresses along the trail 200 until a trailend is reached. For example, where the current waypoint is the intermediate waypoint 202-2, the user may input fourth search terms, such as "CERN" as illustrated in FIG. 3E, that produce a number of fourth search results, such as the link "CERN—the largest particle physics lab in the world" as illustrated in FIG. 3E. The trail exploration mechanism (108) subsequently may determine that the fourth search terms or the fourth search results satisfy the matching criteria of the intermediate waypoint 202-3. Consequently, the intermediate waypoint 202-3 now becomes the current waypoint.

As in the case of the trailhead (202-1) and the intermediate waypoint 202-2, the intermediate waypoint 202-3 may be associated with a navigational message that may be displayed on a user interface such as the trail exploration user interface 110 of FIG. 1. For example, the intermediate waypoint 202-3 of the trail (200) may be associated with a navigational message "Great! Which major city is the closest to CERN?" This navigational message, when displayed, indicates to the user that the next search terms should produce an answer to the question in the navigational message (i.e., "Which major city is the closest to CERN?").

Trailend

Figure 3D:
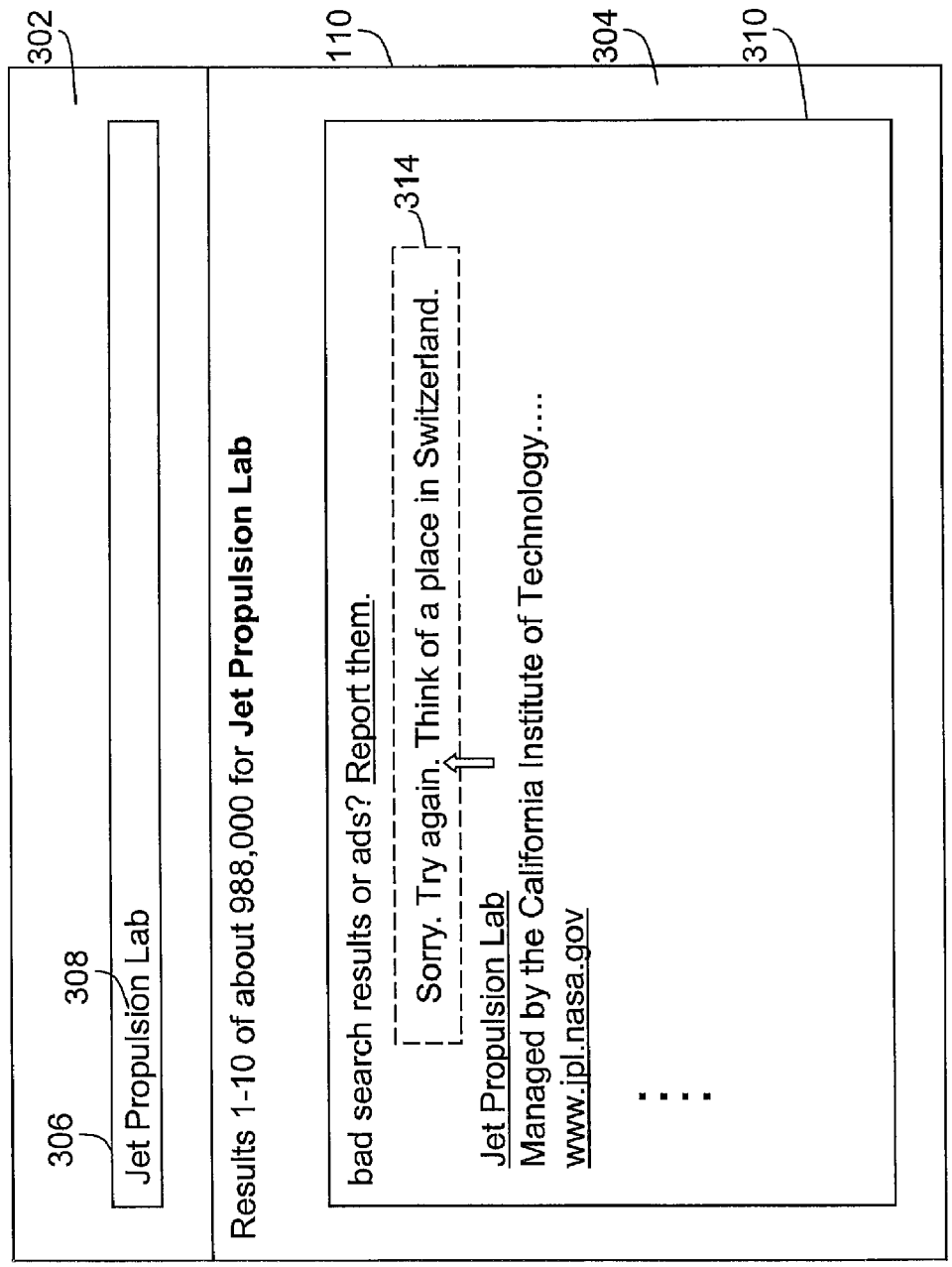
Figure 3E:
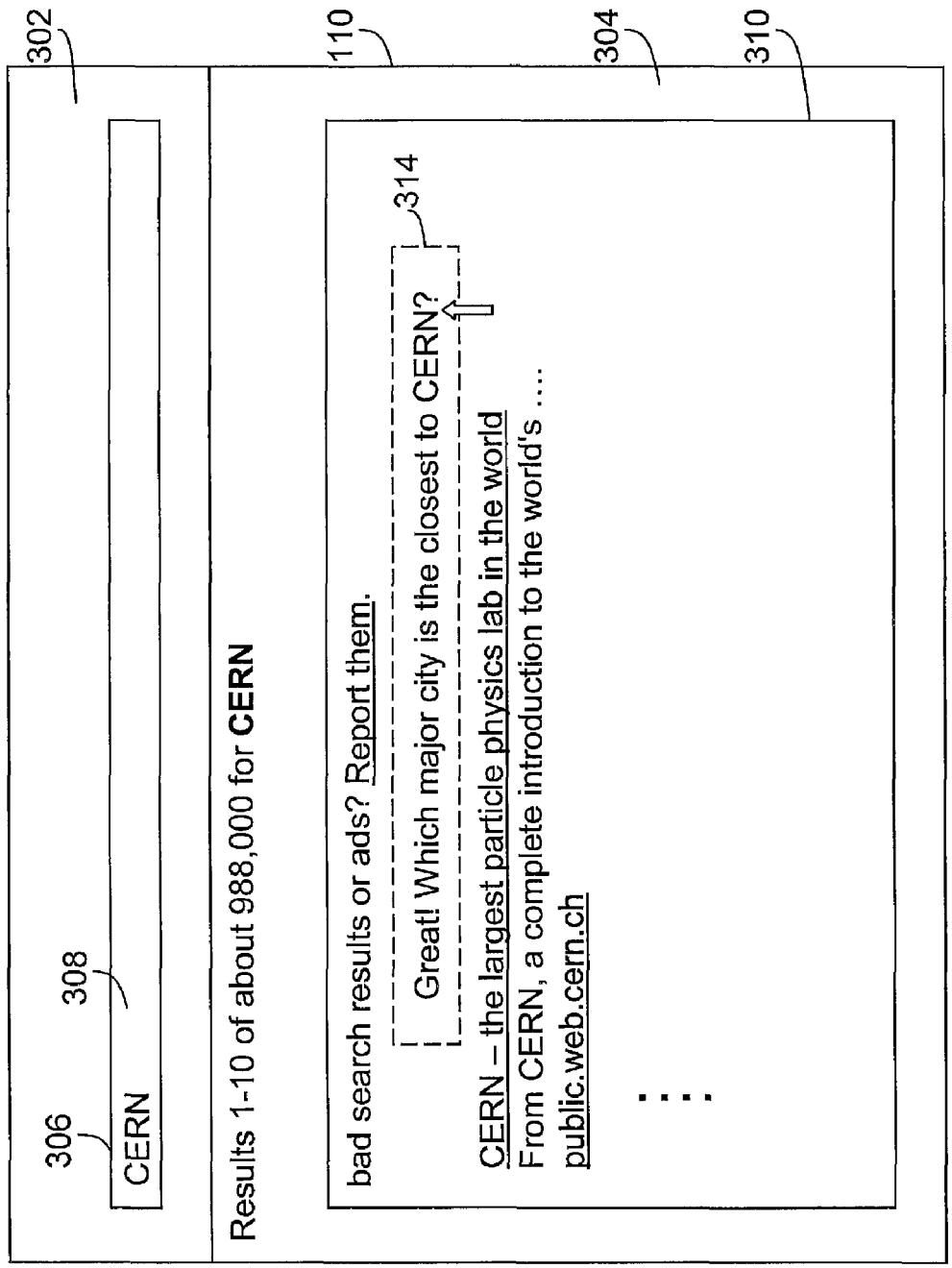
Figure 3F:
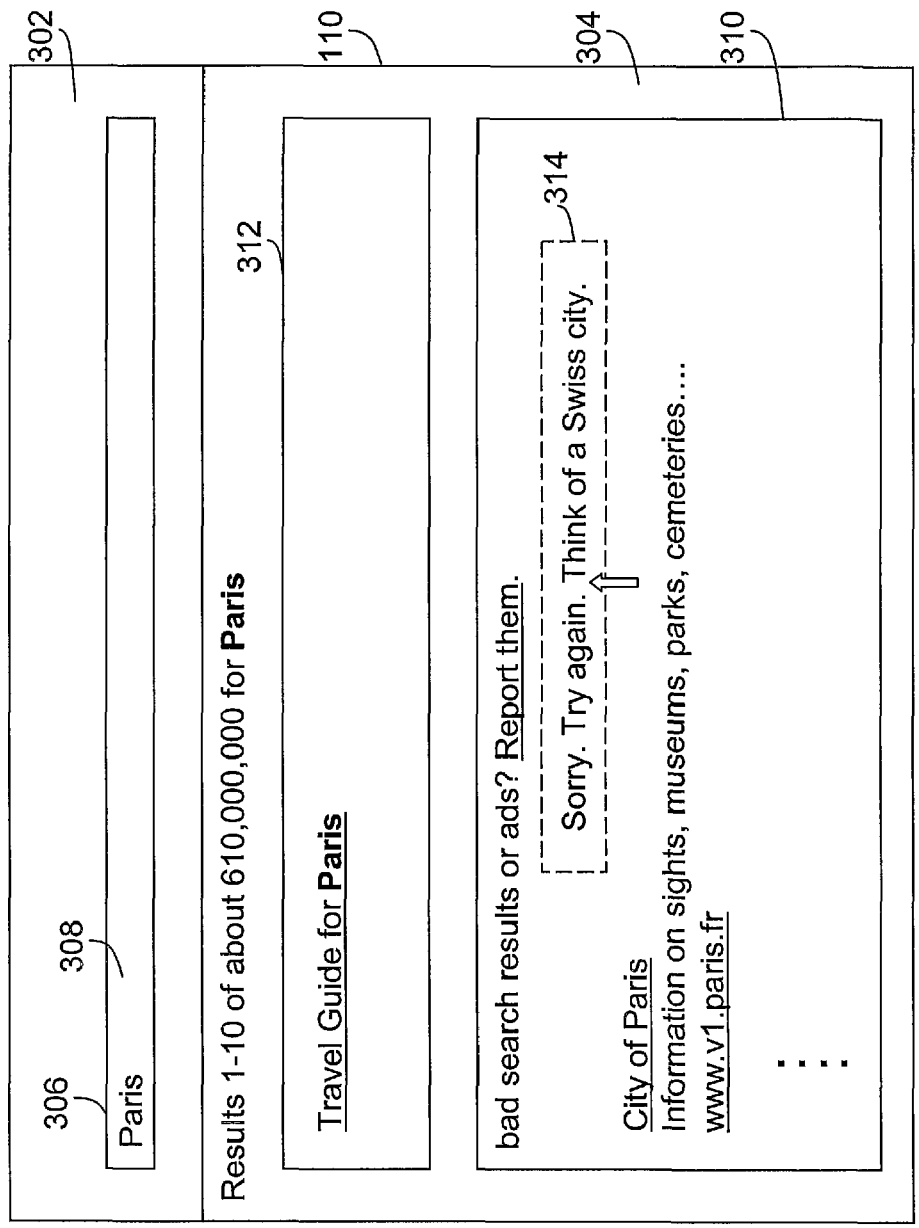
Figure 3G:
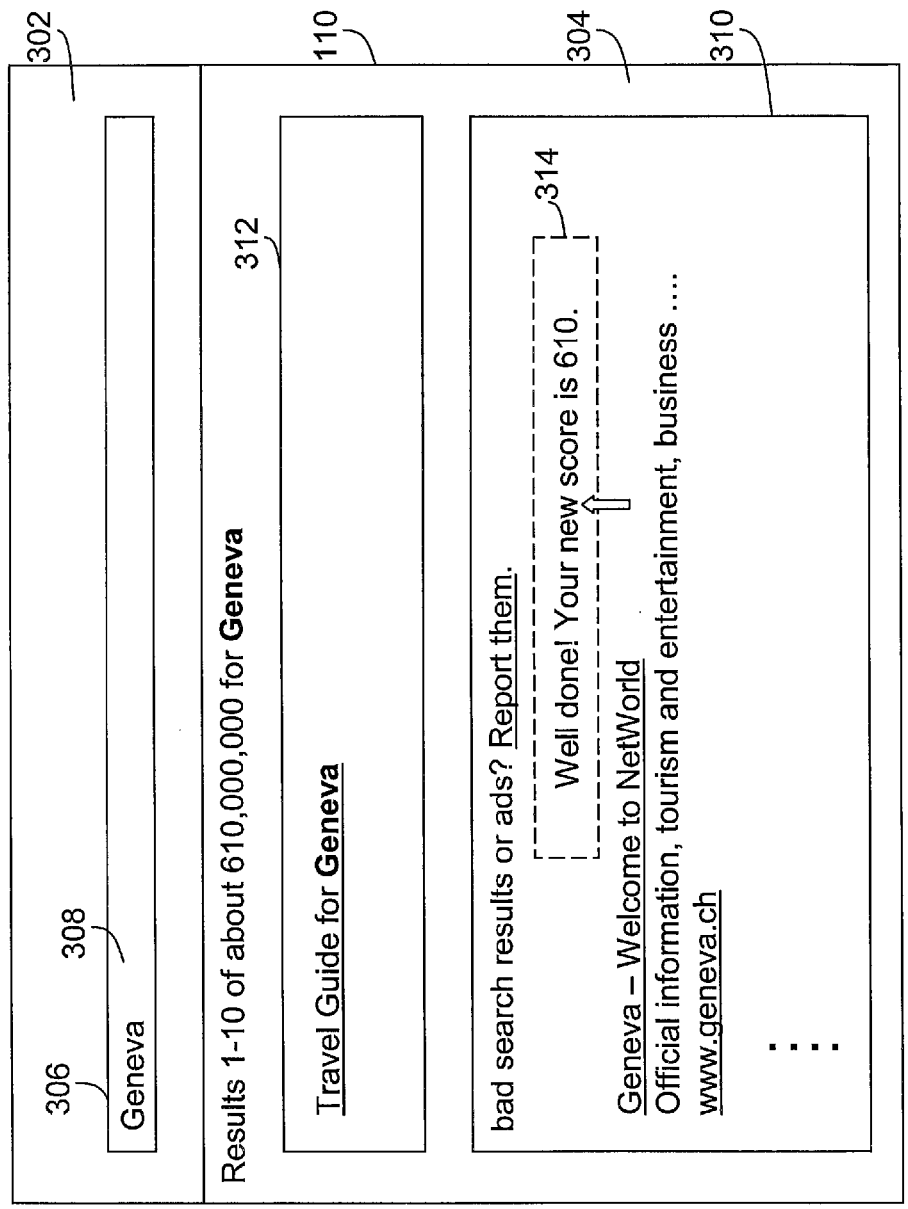

Subsequently, the user may input fifth search terms, such as "Geneva" as illustrated in FIG. 3G, that produce a number of fourth search results, such as the link "Geneva—Welcome to NetWorld" as illustrated in FIG. 3G. The trail exploration mechanism (108) subsequently may determine that the fourth search terms or the fourth search results satisfy the matching criteria of a next waypoint 202-4, which happens to be a trailend. Consequently, the user has successfully explored the trail 200.

The trailend (202-4) may be associated with an end-of-trail message that may be displayed on a user interface such as the trail exploration user interface 110 of FIG. 1. For example, the trailend (202-4) of the trail (200) may be associated with an end-of-trail message "Well done! Your new score is 610." This message may be displayed to indicate to the user that the trail 200 has been successfully explored (i.e., "Well done!"). The message may also indicate that an action with which the trail is associated has been performed in connection with the fact that the trail 200 has been explored by the user. For example, the message may indicate that the user has been credited to have a newer (higher) score than previously.

Like other waypoints, in some embodiments, this end-of-trail message is associated with a portion of content displayed in the trail exploration user interface (110). For example, the trailend (202-4) may be associated with a link that is displayed in the search result region such as "Geneva—Welcome to NetWorld" as illustrated in FIG. 3G. Similar to what has been discussed above, this association between the trailend (202-4) and the link "Geneva—Welcome to NetWorld" may be made inside a downloaded display page by the exploration server 112 that is located remotely from the exploration client (102), or alternatively made by the trail exploration mechanism (108) locally at the exploration client (102).

In some embodiments, an end-of-trail message that is associated with a trailend is hidden from displaying to the user until a user event, such as a mouse-over event, occurs. In an example embodiment, when the user moves a pointer device such as a mouse over the portion of content that displays the link such as "Geneva—Welcome to NetWorld" that is associated with the trailend, the end-of-trail message that is associated with the trailhead is displayed, thereby signaling to the user that a destination of the trail 200 has been successfully reached.

Other Example Ways of Exploring the Trail

While one user may reach a trailend of a trail in a relatively straightforward manner, a different user may do so only after a relatively tortuous journey. For example, a user may enter incorrect search terms at each current waypoint before the trailend.

As illustrated in FIG. 3D, when the user is posed a question of "Where was Tim working at the time?" at the intermediate waypoint 202-2, the user may input search terms "Jet Propulsion Lab", which may not satisfy matching criteria of the next waypoint, i.e., 202-3, but may satisfy matching criteria of a deadend point that is associated with the current waypoint (i.e., 202-2). Consequently, the current waypoint remains at the intermediate waypoint 202-2, until the user provides a correct answer.

Similarly, as illustrated in FIG. 3F, when the user is posed a question of "Which major city is the closest to CERN??" at the intermediate waypoint 202-3, the user may input search terms "Paris", which may not satisfy matching criteria of the next waypoint, i.e., the trailend (202-4), but may satisfy matching criteria of a deadend point that is associated with the current waypoint (i.e., 202-3). Consequently, the current waypoint remains at the intermediate waypoint 202-3, until the user provides a correct answer.

Defining Trails

A user (or a trailblazer) may create definition data for one or more trails. The (trail) definition data may be stored in a database that is accessible by the exploration client (102 of FIG. 1). For example, the database that stores the trail definition may be, but is not limited to, the trail database 114 as illustrated in FIG. 1. The exploration client (102 of FIG. 1), or the trail exploration mechanism (108 of FIG. 1) therein, may access the trail definition data through an exploration server 112. For the purpose of illustration, the exploration server (112 of FIG. 1) may, but is not limited to, provide search results to the exploration client. For the purpose of illustration, to provide search results to the exploration client (102), zero or more other servers may also be used.

Figure 4:
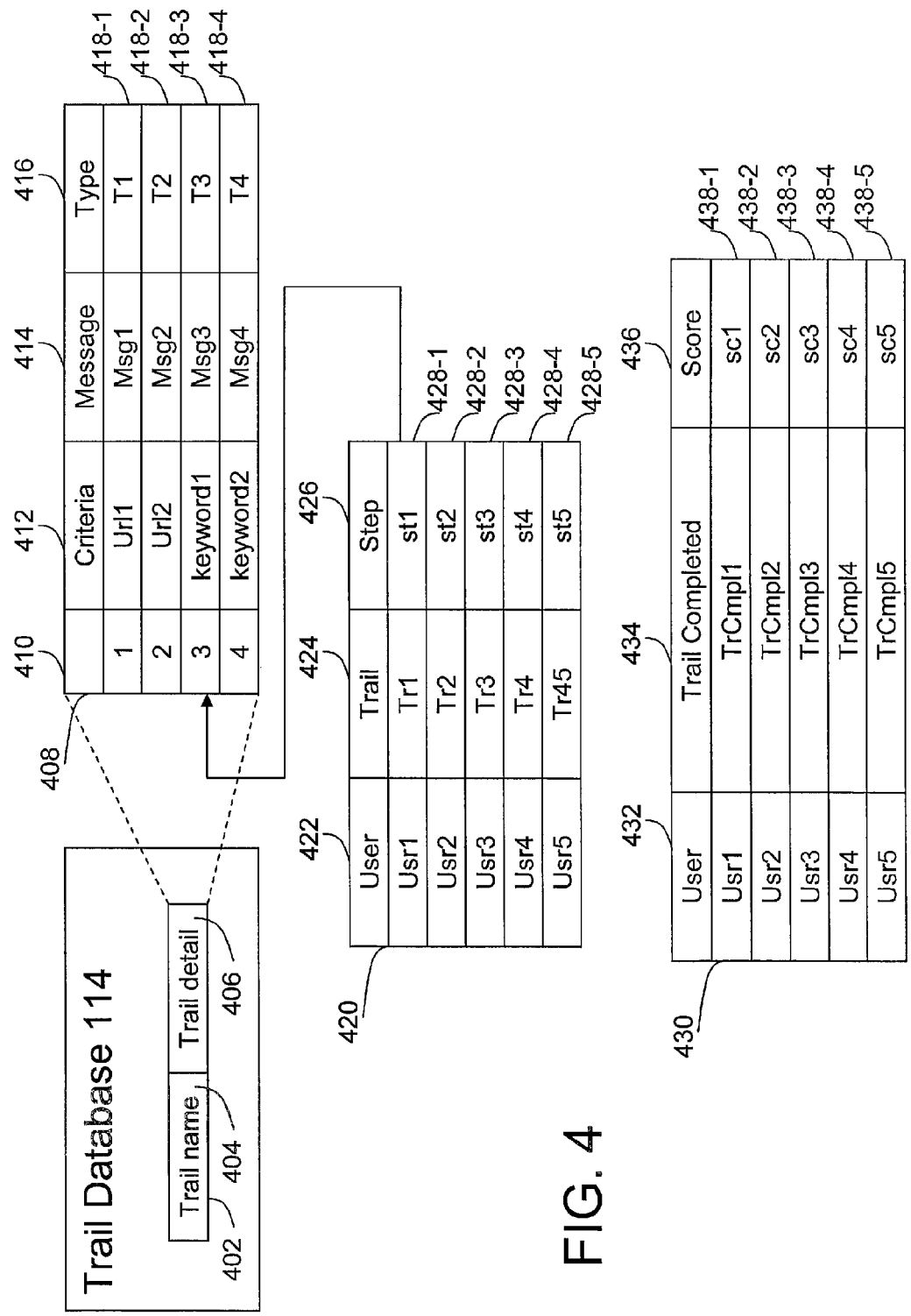
FIG. 4 is a diagram that illustrates example entities that may be involved in a trail database, according to an embodiment of the present invention.

In some embodiments, the trail database 114 stores the trail definition data in the form of one or more records, each of which stores trail definition data for a trail. For example, as illustrated in FIG. 4, an example trail definition record 402 may be created to store the trail definition data for the trail 200 of FIG. 2. In a particular embodiment, such a trail definition record 402 comprises two fields: a trail name field 404 and a trail detail field 406. For example, the trail name field 404 may store "inventor of WWW" for the trail 200 of FIG. 2. The trail detail field 406 may store detail information about the trail 200 of FIG. 2.

In a particular embodiment, actual detail information about a trail such as 200 of FIG. 2 is stored in separate records from the trail definition record. In that embodiment, the trail detail field 406 for a trail stores a reference or a pointer to the separate records that store the actual detail information.

For example, as illustrated in FIG. 4, the trail detail information for the trail 200 of FIG. 2 may be stored in the form of trail detail records 418 (1 through 4) as shown in a trail detail table 408. Each trail detail record 418 may represent a waypoint 202 or a deadend 204. In a particular example embodiment, each trail detail record 418 comprises four columns: a sequence number column 410, a criteria column 412, a message column 414, and a type column 416. The sequence number column 410 may be used to indicate the ordering of the waypoints stored in the trail detail table 408. For example, an earlier waypoint such as the trailhead (202-1 as illustrated in FIG. 2) may be given a smaller value of the sequence number column 410, while a later waypoint such as the trailend (202-4 as illustrated in FIG. 2). In an alternative example embodiment, this ordering may be implicit. For example, a record 418 that appears earlier in the trail detail table 408 represent a location that is earlier on the trail 200. In yet another embodiment, a two-dimensional value that comprises two numeric values may be used to indicate the order. For example, the first of the two numeric values indicates an overall ordering the records 418 or the locations that the records 418 represent (e.g., waypoints or deadends), while the second of the two numeric values may be used to indicate different branches from a specific location. Thus, a two-dimensional value (1, 1) may indicate a particular trailhead for a branch of the trail, while another two-dimensional value (1, 2) may indicate another trailhead for a different branch of the trail. Furthermore, two-dimensional values may be used to indicate multiple branches from other waypoints other than the trailheads.

The criteria column 412 of the trail detail table 408 may store matching criteria of each location, whether that location is a waypoint or a deadend. The message column 414 of the trail detail table 408 may store the welcome message, navigational messages, the end-of-trail message, as discussed previously. The type column 416 may store information for the type of the location with which the record 418 is associated. For example, a possible value of the type column may be a value that represents an associated location as a trailhead, an intermediate waypoint, a deadend, or a trailend, respectively. Possible values of the type column may also include a specification as to what action should be performed should a user successfully reach a trailend. For example, a record 418 with which the trailend 202-4 of the trail 200 is associated may comprise a value of the type column that indicates to increment a trail exploration user's score upon a successful arrival of the trailend by the user.

Keeping User Exploration History

In some embodiments, user exploration history is made persistent in a database. For example, the trail database 114 may contain a history table 420. When a user's current waypoint changes, the trail exploration mechanism (108) may send a request along with exploration data to the exploration server (112) for storing the exploration data to the trail database 114.

The user exploration history may be accessed by any exploration client 102 such as illustrated in FIG. 1. For example, the database that stores the user exploration history may be, but is not limited to, the trail database 114 as illustrated in FIG. 1. The exploration client (102 of FIG. 1), or the trail exploration mechanism (108 of FIG. 1) therein, may access the user exploration history (420) through an exploration server 112.

In some embodiments, the trail database 114 stores the user exploration data in the form of one or more records (428-1 through 5), each of which stores trail exploration data for a user. For example, as illustrated in FIG. 4, an example user exploration record 428-1 may be created to store the trail exploration data for a user "Usr1". In a particular embodiment, such a user exploration record 428 comprises three fields: a user field 422, a trail field 424, and a step field 426. For example, the user field 422 may store "Usr1". The trail field 424 may store an identifier of a trail such as the trail 200 of FIG. 2. The step field 426 may store information identifying a current waypoint on a trail that the user "Usr1" is exploring. In an alternative embodiment, the step field may store a reference to a record in the trail definition table (408), thereby indicating a waypoint represented by the record as the current waypoint that the user "Usr1" is exploring.

Keeping User Scores

In some embodiments, user scores are made persistent in a database. For example, the trail database 114 may contain a user score table 430. After a user successfully reaches a trailend of a trail, the trail exploration mechanism (108) may send a request along with exploration data to the exploration server (112) for creating/updating a new score for the user in the trail database 114.

The user scores may be accessed by any exploration client 102 such as illustrated in FIG. 1. The exploration client (102 of FIG. 1), or the trail exploration mechanism (108 of FIG. 1) therein, may access the user score table (430) through an exploration server 112.

In some embodiments, the trail database 114 stores the use scores in the form of one or more records (438-1 through 5), each of which stores a score for a user. For example, as illustrated in FIG. 4, an example user exploration record 438-1 may be created or updated to store a score for a user "Usr1". In a particular embodiment, such a user score record 438 comprises three fields: a user field 432, a trail completion field 434, and a score field 436. For example, the user field 432 may store "Usr1". The trail completion field 434 may store one or more identifiers for one or more trails that have been successfully completed by the user. The score field 436 may store an accumulative score for the user "Usr1".

Other Example Ways of Starting a Trail

Thus far, a user's starting to explore a trail has been described as entering requisite search terms that satisfy matching criteria of a next waypoint (such as 202-2 of FIG. 2) at a display page (such as FIG. 3A) with a link (such as "Internet101") with which a trailhead (such as 202-1 of FIG. 2) is associated. It should be noted that this is for illustrative purposes only. For purposes of the present invention, the starting of trail exploration may be made in other manners. For example, a user may specify a preference in a parameter that is stored with a browser (for example, in the form of a cookie) indicating that the user is open to trail exploration. That way, a user that is not interested in trail exploration will not be presented with triggers for trail exploration. On the other hand, for a user that specifies in the preference to be interested in the trail exploration, when the trail exploration mechanism (108) or the exploration server (112) detects this preference, a display page on a client machine (such as 102 of FIG. 1) where the user is using may be displayed explicitly or implicitly with a tooltip what trails may be available for the user to explore from that display page.

Also, trail exploration may be ads-driven. For example, an ad may pop up on a client machine (102 of FIG. 1) to entice a user to complete a trail with certain promised rewards (a badge, star, banner, discount coupons, credits, etc.). Such an ad may appear in a different medium (such as television) that may provide an explicit link to a page that contains a trailhead.

In some embodiments, trail exploration (such as a link to a display page contains a trailhead) may also be specified by an educator. Search engines may provide links to trailheads in search results (for example, when a user's search terms match certain keywords). Thus, these and other variations of providing triggers to explore trails may be within the scope of the present invention.

In some embodiments, a user may explicitly seek out trails that the user wishes to explore. For example, the user may access a particular page and type in "webhunt al gore", wherein the word "webhunt" is an example keyword which the exploration server may use it to trigger a search for appropriate trails that pertains to a topic such as "al gore" as typed in by the user. A number of trails that are related to the topic typed in by the user will be determined and displayed to the user for exploration. Trails that are deemed as related to the topic typed in by the user may be determined based on a similarity analysis between the topic and the trail name and/or between the topic and the contents of messages in the trails.

Common Incorrect Answers

At a particular current waypoint, a user may provide a myriad of incorrect answers that do not satisfy matching criteria of a waypoint that is next in the ordered series of waypoints on a particular trail. In some embodiments, matching criteria that is associated with deadends that are associated with the particular current waypoint represent commonplace incorrect answer. For example, a common incorrect answer to the question "Who invented the World Wide Web?" may be "Al Gore". Thus, a deadend that is associated with a waypoint that poses the above question may specify matching criteria based on this common incorrect answer.

Correct Answers Provided in a Linked Document

In some embodiments, one or more correct answers to one or more questions posed by a current waypoint may be provided in a document that is loadable by clicking a link in a display page with which the current waypoint is associated. In a particular embodiment, the current waypoint's message is also associated with the link. Therefore, by clicking the link, a user loads the document that has the answers. This way, a user who reads the document will know what search terms to be next entered in order to generate the correct answers. This is highly useful, for example, when trail exploration is used for educational purposes.

Tracking a User's Trail Exploration

When a user enters wrong search terms to a question posted at a current waypoint, the user will be at a display page that shows search results that are related to the wrong search terms. In some embodiments, a user may enter new search terms that constitute an attempt to provide correct answers at that display page, without needing to go back to another display page that is associated with the current waypoint. In these embodiments, a trail exploration mechanism such as 108 may keep track of the current waypoint no matter what display page the user is currently on. In a particular embodiment, this tracking of user's trail exploration progress may be based on information stored in a history table such as 420 of FIG. 4.

In some embodiments, the trail exploration mechanism (108), working in conjunction with the exploration server (112), identifies the user by an internet address of a client machine that the user is using, or a cookie in a browser that the user is using, or other variations of user sessioning techniques. Once the user is identified, a history record in the history table 420 may be retrieved, thereby providing tracking information on trail exploration for the user such as the current waypoint at which the user is.

Lifecycle of Trail Exploration

History records 428 in the history table 420 may be used by the trail exploration mechanism (108) and/or by the exploration server (112) to record current exploration positions of a user. As used herein, the term "current position" refers to the current waypoint at which the user last arrives. The user may have arrived at that current waypoint a day ago but remains there because no further exploration is made or because all further exploration efforts have been futile. In some embodiments, a configurable timeout value may be specified by the user or by the trail exploration mechanism (108). If the user fails to make new exploration effort or fails to make progress on a trail, that trail may be deemed as abandoned. In some embodiments, when a user embarks on a different trail, the previously explored trail, if not successfully concluded (i.e., by reaching a trailend of the previously explored trail), may be deemed as abandoned. On the other hand, in some other embodiments, a user is permitted to explore multiple trails. Correct answers to any of the multiple trails will advance the user along that trail.

Maintenance of Trails

In some embodiments, a program may be deployed to maintain trails stored in a database. For example, such a program may be deployed on the exploration server (112 of FIG. 1) to maintain trails stored in the trail database (114 of FIG. 1). The program may determine from trail exploration data that certain trails no longer make sense, as no user has been able to successfully explore those trails, or no user has been interested in exploring those trails. This may happen when a trailblazer fails to update trail definition data to ensure that correct answers do appear when correct search terms are entered. This may also happen when popularity ranks of display pages change.

In some embodiments, users may provide feedbacks or ratings on trails they explore. These feedbacks or ratings about the trails may be stored in the same records as those storing trail definition data for the trails. The program that performs the maintenance of the trails may take into consideration the feedbacks provided by the user. That way, better ranked and/or better maintained trails may be more frequently made available for users to explore than otherwise.

In some embodiments, trail exploration related features on a display page (such as any of FIG. 3A through FIG. 3G) may be coded by the exploration server (112) in a document that gives rise to the display page. In some embodiments, trail exploration related features on a display page (such as any of FIG. 3A through FIG. 3G) may be set up locally (relative to the exploration client 102) by the trail exploration mechanism (108) in a document that gives rise to the display page. For example, the trail exploration mechanism (108) may obtain data in the trail database (114) but code the trail exploration features into a document that has been received from a web server such as 112 of FIG. 1. This may be accomplished using a Greasemonkey type of functionality that can be made available in a browser that the user uses. Thus, in these embodiments, a search engine or a web server may be oblivious to trail exploration but only responds to requests for data in the trail database, for example, by the trail exploration mechanism (108 of FIG. 1).

Example Operation

Figure 5A:
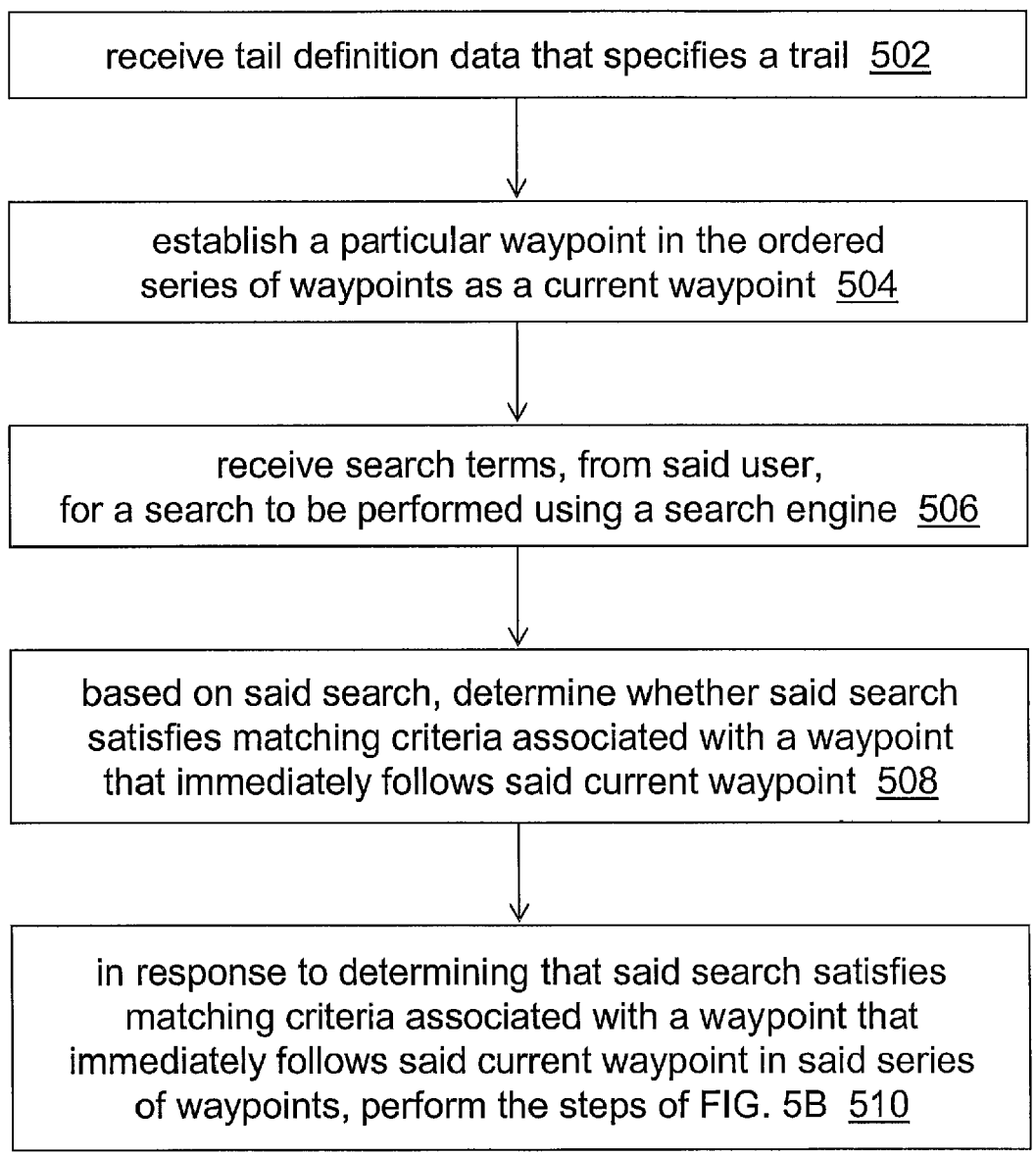
FIG. 5A, FIG. 5B and FIG. 5C are flow diagrams that illustrate example flows of trail exploration process and trail creation process, according to an embodiment of the present invention.

FIG. 5A is an example flow diagram that illustrates a process 500 for supporting trail-based exploration of a repository of documents, according to an embodiment of the present invention. In block 502, the trail exploration mechanism (108) receives trail definition data that specifies a trail (such as shown in FIG. 2). This trail includes an ordered series of waypoints, which include: a trailhead, zero or more intermediate waypoints; and one or more trailends. In some embodiments, the trailhead is associated with a message. In some embodiments, each intermediate waypoint is associated with matching criteria and a message. In some embodiments, each trailend is associated with matching criteria and an action.

In block 504, the trail exploration mechanism (108) establishes a particular waypoint in the ordered series of waypoints as a current waypoint. In one embodiment, to establish a particular waypoint in the ordered series of waypoints as a current waypoint, the trail exploration mechanism (108) retrieves history data that is associated with the user. Based on trail exploration information in the history data, the trail exploration mechanism (108) establishes the particular waypoint in the ordered series of waypoints as a current waypoint. However, if there is no history data that is associated with the user, for example, where the user just starts to explore the trail, the trail exploration mechanism (108) may establish the trailhead of the trail as a current waypoint.

In block 506, the trail exploration mechanism (108) receives search terms, from the user, for a search to be performed using a search engine.

In block 508, the trail exploration mechanism (108), based on the search, determines whether the search satisfies matching criteria associated with a waypoint that immediately follows the current waypoint in the series of waypoints. In one embodiment, the matching criteria associated with the waypoint that immediately follows the current waypoint specify a URL. Thus, to determine whether the search satisfies the matching criteria, the trail exploration mechanism (108) determines whether a document associated with the URL is listed in the results produced by the search. In another embodiment, the matching criteria associated with the waypoint that immediately follows the current waypoint may specify particular search terms. Thus, to determine whether said search satisfies the matching criteria, the trail exploration mechanism (108) determines whether the received search terms match the particular search terms.

In some embodiments, the document associated with the URL (which has been specified as matching criteria for the current waypoint) provides information on next search terms. These next search terms, if inputted by the user, would give rise to a next search that satisfies next matching criteria associated with a next waypoint that immediately follows the waypoint that immediately follows said current waypoint. For example, a student following a study trail may read the document associated with the URL, get familiar with the contents, and receive information on the search terms for the next search.

Figure 5B:
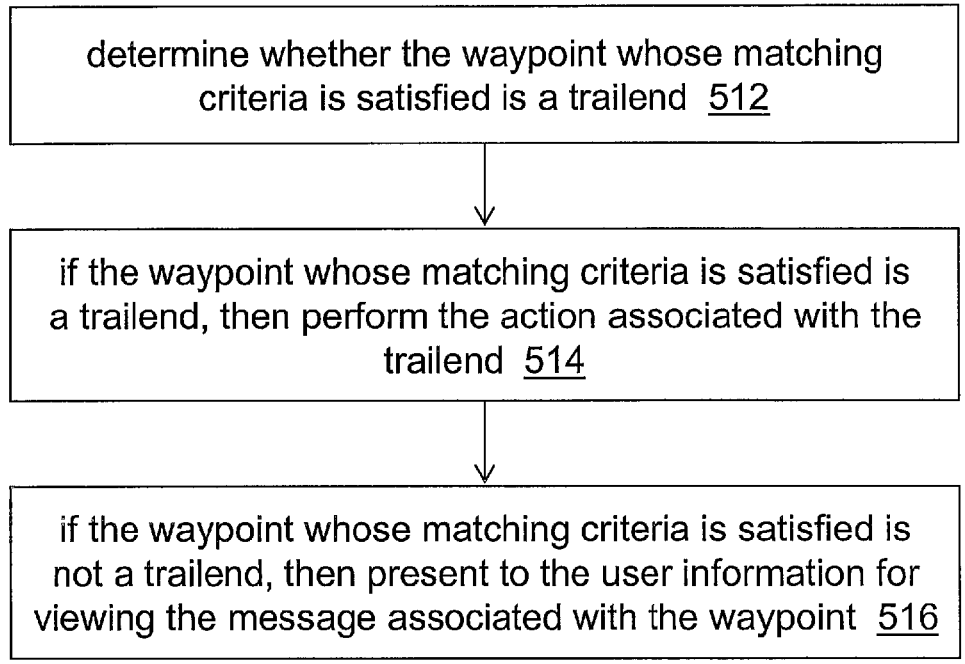

In block 510, the trail exploration mechanism (108), in response to determining that the search satisfies matching criteria associated with a waypoint that immediately follows the current waypoint in the series of waypoints, performs the steps as illustrated in FIG. 5B.

In block 512, as illustrated in FIG. 5B, the trail exploration mechanism (108) determines whether the waypoint whose matching criteria is satisfied is a trailend. If that is the case, as illustrated in block 514, the trail exploration mechanism (108) then performs the action associated with the trailend. Otherwise, if that is not the case, as illustrated in block 516 of FIG. 5B, the trail exploration mechanism (108) then presents to the user information for viewing the message associated with the waypoint. In that case, the trail exploration mechanism (108) establishes the waypoint that immediately follows the current waypoint in the series of waypoints as the (new) current waypoint and, repeats one or more times the steps in blocks 506, 508 and 510 until the user aborts exploring the trail or successfully reaches one of the trailends. In some embodiments, any or all of the steps described above such as establishing new current waypoint and repeating the steps in blocks 506, 508 and 510 are performed by software (for example, browser, browser with one or more plug-ins, a downloaded page processed by a browser, etc.) executing on a computer through which the user entered these search terms.

As noted, in some embodiments, any of the trailend can be associated with an action. In an example embodiment, such an action is an action which, when performed, determines a new score for a user who successfully reached the associated trailend. In another example embodiment, such an action is an action which, when performed, grants a reward to a user who successfully reached the associated trailend. In another example embodiment.

In some embodiments, when the user aborts exploring the trail, the trail exploration mechanism saves, into history data that is associated with the user, trail exploration information related to the trail.

In some embodiments, as a starting point for exploring a trail, a plurality of selectable trails that includes the trail may be displayed on the exploration client (102) to the user. For example, the trail exploration mechanism (108) may receive one or more keywords from the user and, accordingly, determine the plurality of selectable trails using the one or more keywords. In another example embodiment, a selection of a display page may be received from the user by the trail exploration mechanism (108) or the exploration server (112). The trail exploration mechanism (108) or the exploration server (112) may thereupon determine the plurality of selectable trails that are associated with the display page.

Figure 5C:
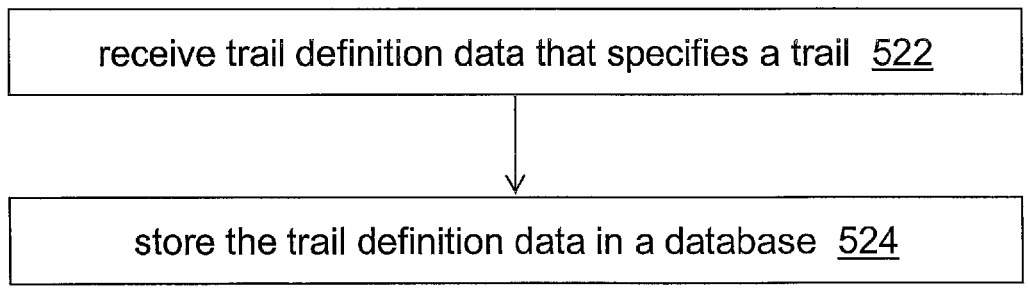

FIG. 5C is an example flow diagram that illustrates a process 520 for making a trail of a repository of documents, according to an embodiment of the present invention. In block 522, the exploration server (112) receives trail definition data that specifies a trail. This trail definition data may be sent by the trail definition mechanism (104) as illustrated in FIG. 1. In some embodiments, the trail received in block 522 is a trail that has been illustrated in FIG. Thus, this trail includes an ordered series of waypoints, which include: a trailhead, zero or more intermediate waypoints; and one or more trailends. In addition, in some embodiments, the trailhead may be associated with a message in some embodiments; each intermediate waypoint is associated with matching criteria and a message; and each trailend is associated with matching criteria and an action.

In block 524, the exploration server (112) stores the trail definition data in a database. For example, the trail definition data may be stored in table 408 as illustrated in FIG. 4.

Hardware Overview

Figure 6:
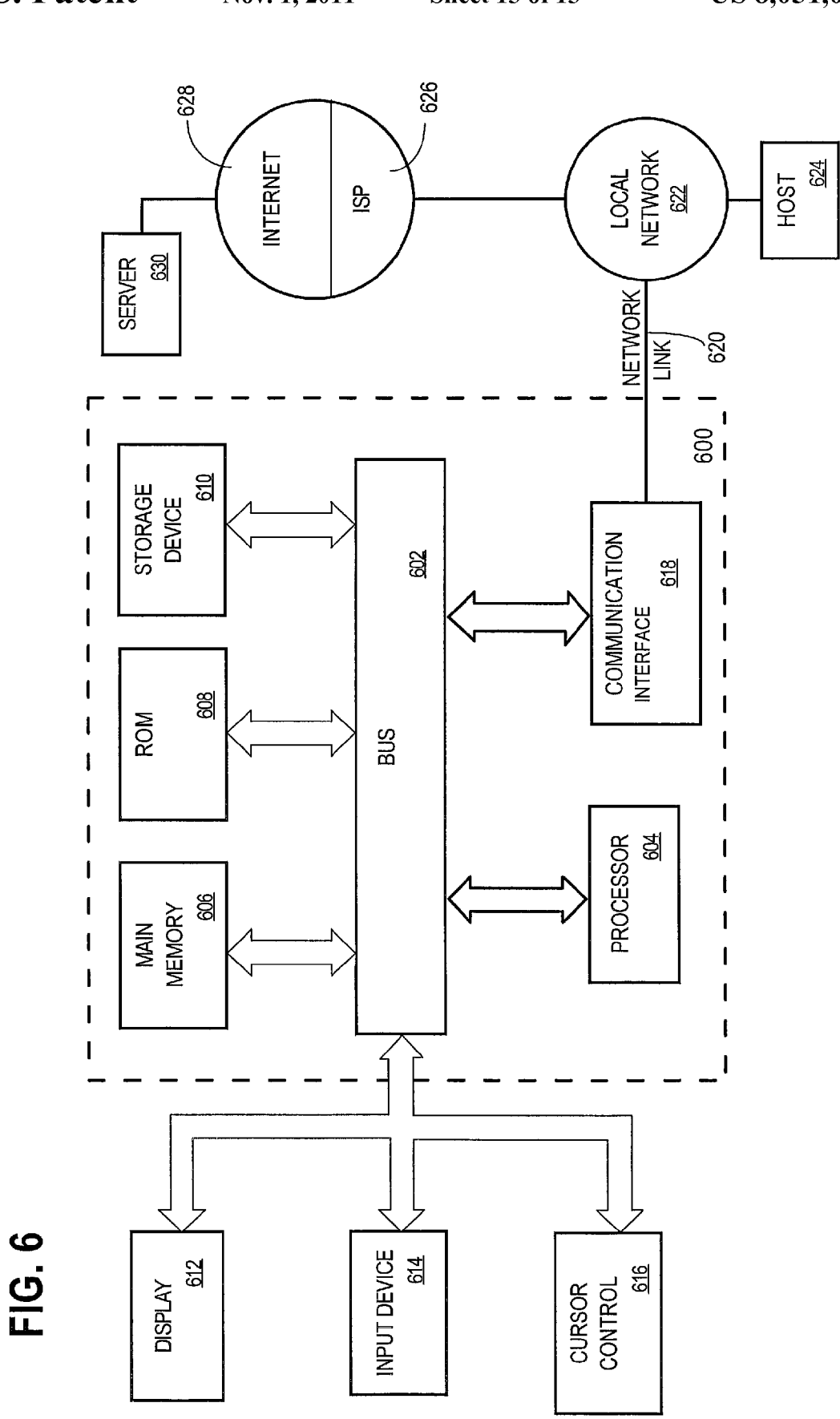
FIG. 6 is a block diagram that illustrates a computer system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may be used to implement the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for trail-based exploration by a user of a repository of documents, comprising the computer-executed steps of:
receiving trail definition data that specifies a trail, wherein the trail includes an ordered series of waypoints and wherein the ordered series of waypoints include:
a trailhead,
zero or more intermediate waypoints; and
one or more trailends;
wherein each intermediate waypoint is associated with corresponding matching criteria;
wherein each trailend is associated with matching criteria;
wherein the ordered series includes a first waypoint and a second waypoint that immediately follows the first waypoint;
wherein the second waypoint is either an intermediate waypoint or a trailend;
wherein the second waypoint corresponds to a particular set of matching criteria and to a particular action;
establishing the first waypoint in the ordered series of waypoints as a current waypoint;
while the first waypoint is the current waypoint, performing the steps of:
when a user performs a search based on user-entered search terms against said repository, performing the steps of:
(a) comparing the user-entered search terms against contents of items in the repository to generate search results for the search based, at least in part, on which items within the repository match the user-entered search terms; and
(b) determining whether the search satisfies the particular set of matching criteria associated with the second waypoint;
in response to determining that the search satisfies the particular set of matching criteria associated with the second waypoint, establishing the second waypoint as the current waypoint and performing the particular action;
wherein at least the steps of comparing and determining are performed by one or more computing devices.

2. The method of claim 1, wherein establishing the first waypoint in the ordered series of waypoints as a current waypoint comprises:
retrieving history data that is associated with said user; and
based on trail exploration information in the history data, establishing the first waypoint in the ordered series of waypoints as a current waypoint.

3. The method of claim 1, wherein establishing the first waypoint in the ordered series of waypoints as a current waypoint comprises establishing a trailhead of the trail as a current waypoint.

4. The method of claim 1, further comprising:
as the user performs new searches against said repository, determining whether the new searches satisfy matching criteria associated with a third waypoint that immediately follows the second waypoint; and
in response to determining that the searches satisfy matching criteria associated with a third waypoint that immediately follows the second waypoint, performing an action associated with the third waypoint.

5. The method of claim 1, further comprising saving, into history data that is associated with said user, trail exploration information related to, each of a plurality of trails, wherein said plurality of trails includes said trail, and wherein the history data indicates a distinct current waypoint for said user for each trail of said plurality of trails.

6. The method of claim 1, wherein:
the matching criteria associated with the second waypoint specifies a URL; and
wherein determining whether the search satisfies matching criteria associated with the second waypoint includes determining whether a document associated with the URL is listed in search results produced by said search.

7. The method of claim 6, wherein the document associated with the URL provides information on next search terms for a next search that satisfies next matching criteria associated with a third waypoint that immediately follows the second waypoint.

8. The method of claim 1, wherein:
the matching criteria associated with the second waypoint specifies particular search terms; and
wherein determining whether the search satisfies matching criteria associated with the second waypoint includes determining whether said received search terms match said particular search terms.

9. The method of claim 1, further comprising displaying to said user a plurality of selectable trails that includes said trail.

10. The method of claim 9, further comprising:
receiving one or more keywords from the user; and
determining the plurality of selectable trails using the one or more keywords.

11. The method of claim 9, further comprising:
receiving a selection of a display page from the user; and
determining the plurality of selectable trails that are associated with the display page.

12. The method of claim 1, further comprising:
associating a link with a message that is associated with the first waypoint;
displaying said link to said user; and
displaying to said user the message that is associated with the first waypoint in response to receiving a user input event in connection with said link.

13. The method of claim 1, wherein at least one waypoint in said series of ordered waypoints is associated with a dead end.

14. The method of claim 1, wherein at least one waypoint in said series of ordered waypoints is associated with a dead end, wherein the dead end is associated with second matching criteria and a second message; and further comprising:
determining whether the search satisfies specific matching criteria associated with a dead end that is associated with the first waypoint;
in response to determining that the search satisfies specific matching criteria associated with a dead end that is associated with the first waypoint, performing;
associating a link with a particular message that is associated with the dead end;
displaying said link to said user; and
displaying to said user the particular message that is associated with the dead end in response to receiving a user input event in connection with said link.

15. The method of claim 1, further comprising maintaining trail exploration information for one or more active trails that are being explored by said user, wherein the one or more active trails include said trail.

16. The method of claim 1, further comprising deleting one or more trails that were previously available for exploration.

17. The method of claim 1, wherein said second waypoint is one in a plurality of waypoints that immediately follow said current waypoint.

18. The method of claim 1, wherein performing an action associated with the second waypoint includes:
   determining whether the second waypoint is a trailend of the trail; and
   in response to determining that the second waypoint is a trailend of the trail, performing the particular action associated with the trailend.

19. The method of claim 1, wherein performing an action associated with the second waypoint includes:
   determining that the second waypoint is not a trailend of the trail; and
   in response to determining that the second waypoint is not a trailend of the trail, presenting the message associated with the second waypoint.

20. The method of claim 1, further comprising based, at least in part, on determining that the current waypoint of the user is the first waypoint, causing a message associated with the first waypoint to be displayed to the user.

21. The method of claim 20, wherein the message associated with the first waypoint is displayed to the user in response to a user interface action, performed by the user, at an item displayed to the user while the first waypoint is the current waypoint for the user.

22. The method of claim 1, wherein determining whether the searches satisfy matching criteria associated with a second waypoint includes at least one of: a) determining whether search terms specified by the user provide a correct answer to the question, or b) determining whether search results of the searches provide a correct answer to the question, wherein the correct answer is specified in the matching criteria associated with the second waypoint.

23. The method of claim 1, wherein the particular action associated with the second waypoint includes determining a score for the user.

24. The method of claim 1, wherein the second waypoint is a trailend of the trail, and wherein the particular action associated with the second waypoint includes granting the user a reward associated with the trail based on the user having reached the trailend of the trail after having visited each waypoint in the trail.

25. A non-transitory computer readable storage medium storing one or more sequences of instructions which, when executed by one or more processors, cause:
   receiving trail definition data that specifies a trail, wherein the trail includes an ordered series of waypoints and wherein the ordered series of waypoints include:
      a trailhead,
      zero or more intermediate waypoints; and
      one or more trailends;
   wherein each intermediate waypoint is associated with corresponding matching criteria;
   wherein each trailend is associated with matching criteria;
   wherein the ordered series includes a first waypoint and a second waypoint that immediately follows the first waypoint;
   wherein the second waypoint is either an intermediate waypoint or a trailend;
   wherein the second waypoint corresponds to a particular set of matching criteria and to a particular action;
   establishing the first waypoint in the ordered series of waypoints as a current waypoint;
   while the first waypoint is the current waypoint, performing the steps of:
      when a user performs a search based on user-entered search terms against said repository, performing the steps of:
         (a) comparing the user-entered search terms against contents of items in the repository to generate search results for the search based, at least in part, on which items within the repository match the user-entered search terms; and
         (c) determining whether the search satisfies the particular set of matching criteria associated with the second waypoint;
      in response to determining that the search satisfies the particular set of matching criteria associated with the second waypoint, establishing the second waypoint as the current waypoint and performing the particular action.

26. The computer readable storage medium of claim 25, wherein establishing the first waypoint in the ordered series of waypoints as a current waypoint comprises:
   retrieving history data that is associated with said user; and
   based on trail exploration information in the history data, establishing the first waypoint in the ordered series of waypoints as a current waypoint.

27. The computer readable storage medium of claim 25, wherein establishing the first waypoint in the ordered series of waypoints as a current waypoint comprises establishing a trailhead of the trail as a current waypoint.

28. The computer readable storage medium of claim 25, wherein the one or more sequences of instructions further comprise instructions which, when executed by one or more processors, cause:
   establishing the second waypoint as the current waypoint;
   as the user performs new searches against said repository, determining whether the new searches satisfy matching criteria associated with a third waypoint that immediately follows the second waypoint; and
   in response to determining that the searches satisfy matching criteria associated with a third waypoint that immediately follows the second waypoint, performing an action associated with the third waypoint.

29. The computer readable storage medium of claim 25, wherein the one or more sequences of instructions further comprise instructions which, when executed by one or more processors, cause saving, into history data that is associated with said user, trail exploration information related to, each of a plurality of trails, wherein said plurality of trails includes said trail.

30. The computer readable storage medium of claim 25, wherein:
   the matching criteria associated with the second waypoint specifies a URL; and
   wherein determining whether the search satisfies matching criteria associated with a second waypoint includes determining whether a document associated with the URL is listed in search results produced by said search.

31. The computer readable storage medium of claim 25, wherein the document associated with the URL provides information on next search terms for a next search that satisfies next matching criteria associated with a third waypoint that immediately follows the second waypoint.

32. The computer readable storage medium of claim 25, wherein:
   the matching criteria associated with the second waypoint specifies particular search terms; and
   wherein determining whether the search satisfies matching criteria associated with a second waypoint includes determining whether said received search terms match said particular search terms.

33. The computer readable storage medium of claim 25, wherein the one or more sequences of instructions further comprise instructions which, when executed by one or more processors, cause displaying to said user a plurality of selectable trails that includes said trail.

34. The computer readable storage medium of claim 33, wherein the one or more sequences of instructions further comprise instructions which, when executed by one or more processors, cause:
receiving one or more keywords from the user; and
determining the plurality of selectable trails using the one or more keywords.

35. The computer readable storage medium of claim 33, wherein the one or more sequences of instructions further comprise instructions which, when executed by one or more processors, cause:
receiving a selection of a display page from the user; and
determining the plurality of selectable trails that are associated with the display page.

36. The computer readable storage medium of claim 25, wherein the one or more sequences of instructions further comprise instructions which, when executed by one or more processors, cause:
associating a link with a message that is associated with the first waypoint;
displaying said link to said user; and
displaying to said user the message that is associated with the first waypoint in response to receiving a user input event in connection with said link.

37. The computer readable storage medium of claim 25, wherein at least one waypoint in said series of ordered waypoints is associated with a dead end.

38. The computer readable storage medium of claim 25, wherein at least one waypoint in said series of ordered waypoints is associated with a dead end, wherein the dead end is associated with second matching criteria and a second message;
and further comprising:
determining whether the search satisfies specific matching criteria associated with a dead end that is associated with the first waypoint;
in response to determining that the search satisfies specific matching criteria associated with a dead end that is associated with the first waypoint, performing;
associating a link with a particular message that is associated with the dead end;
displaying said link to said user; and
displaying to said user the particular message that is associated with the dead end in response to receiving a user input event in connection with said link.

39. The computer readable storage medium of claim 25, wherein the one or more sequences of instructions further comprise instructions which, when executed by one or more processors, cause maintaining trail exploration information for one or more active trails that are being explored by said user, wherein the one or more active trails include said trail.

40. The computer readable storage medium of claim 25, wherein the one or more sequences of instructions further comprise instructions which, when executed by one or more processors, cause deleting one or more trails that were previously available for exploration.

41. The computer readable storage medium of claim 25, wherein said second waypoint is one in a plurality of waypoints that immediately follow said current waypoint.

42. The computer readable storage medium of claim 25, wherein the instructions for performing an action associated with the second waypoint include instructions for:
determining whether the second waypoint is a trailend of the trail; and
in response to determining that the second waypoint is a trailend of the trail, performing the particular action associated with the trailend.

43. The computer readable storage medium of claim 25, wherein the instructions for performing an action associated with the second waypoint further comprise instructions for:
determining that the second waypoint is not a trailend of the trail; and
in response to determining that the second waypoint is not a trailend of the trail, presenting the message associated with the second waypoint.

44. The computer readable storage medium of claim 25, wherein the one or more sequences of instructions further comprise instructions, when executed by one or more processors, cause, based, at least in part, on determining that the current waypoint of the user is the first waypoint, a message associated with the first waypoint to be displayed to the user.

45. The computer readable storage medium of claim 44, wherein the message associated with the first waypoint is displayed to the user in response to a user interface action, performed by the user, at an item displayed to the user while the first waypoint is the current waypoint for the user.

46. The computer readable storage medium of claim 25, wherein determining whether the search satisfies matching criteria associated with a second waypoint includes at least one of: a) determining whether search terms specified by the user provide a correct answer to the question, or b) determining whether search results of the searches provide a correct answer to the question.

47. The computer readable storage medium of claim 25, wherein the particular action associated with the second waypoint includes determining a score for the user.

48. The computer readable storage medium of claim 25, wherein the second waypoint is a trailend of the trail, and wherein the particular action associated with the second waypoint includes granting the user a reward associated with the trail based on the user having reached the trailend of the trail after having visited each waypoint in the trail.

* * * * *